United States Patent
Park et al.

(10) Patent No.: US 10,638,462 B2
(45) Date of Patent: Apr. 28, 2020

(54) METHOD FOR TRANSMITTING UPLINK CONTROL INFORMATION AND DEVICE THEREFOR

(71) Applicant: LG ELECTRONICS INC., Seoul (KR)

(72) Inventors: Hanjun Park, Seoul (KR); Suckchel Yang, Seoul (KR); Daesung Hwang, Seoul (KR); Joonkui Ahn, Seoul (KR); Seungmin Lee, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/523,640

(22) PCT Filed: Dec. 8, 2015

(86) PCT No.: PCT/KR2015/013404
§ 371 (c)(1),
(2) Date: May 1, 2017

(87) PCT Pub. No.: WO2016/093600
PCT Pub. Date: Jun. 16, 2016

(65) Prior Publication Data
US 2017/0318575 A1    Nov. 2, 2017

Related U.S. Application Data

(60) Provisional application No. 62/089,176, filed on Dec. 8, 2014, provisional application No. 62/096,903, filed
(Continued)

(51) Int. Cl.
*H04W 72/04* (2009.01)
*H04L 5/00* (2006.01)

(52) U.S. Cl.
CPC ....... *H04W 72/0413* (2013.01); *H04L 5/0055* (2013.01); *H04W 72/0446* (2013.01); *H04W 72/0453* (2013.01); *H04L 5/001* (2013.01)

(58) Field of Classification Search
CPC ......... H04W 72/0413; H04W 72/0453; H04W 72/0446; H04L 5/0055
See application file for complete search history.

(56) References Cited

U.S. PATENT DOCUMENTS

2009/0296644 A1    12/2009  Cheon et al.
2010/0272019 A1*   10/2010  Papasakellariou ... H04B 7/0417
                                                        370/328
(Continued)

FOREIGN PATENT DOCUMENTS

CA    2809325     3/2012
CN    102668482   9/2012
(Continued)

OTHER PUBLICATIONS

Canadian Intellectual Property Office Application Serial No. 2,967,281, Office Action dated Apr. 4, 2018, 4 pages.
(Continued)

*Primary Examiner* — Anh Vu H Ly
*Assistant Examiner* — Hector Reyes
(74) *Attorney, Agent, or Firm* — Lee Hong Degerman Kang Waimey

(57) ABSTRACT

A method for transmitting uplink control information in a wireless communication system according to an embodiment of the present invention, which is performed by a terminal, may comprise the steps of: determining the number of coded symbols according to the payload size of uplink control information to be transmitted; and mapping the uplink control information to an uplink resource according to the determined number of the coded symbols, wherein the
(Continued)

number of the coded symbols is determined using a parameter selected according to the payload size of the uplink control information to be transmitted.

24 Claims, 12 Drawing Sheets

Related U.S. Application Data on Dec. 26, 2014, provisional application No. 62/112,669, filed on Feb. 6, 2015, provisional application No. 62/132,519, filed on Mar. 13, 2015, provisional application No. 62/204,487, filed on Aug. 13, 2015, provisional application No. 62/207,917, filed on Aug. 21, 2015, provisional application No. 62/222,176, filed on Sep. 22, 2015.

(56) References Cited

U.S. PATENT DOCUMENTS

| | | | | |
|---|---|---|---|---|
| 2011/0080880 | A1* | 4/2011 | Yin | H04B 7/0682 370/329 |
| 2011/0228863 | A1* | 9/2011 | Papasakellariou | H04L 1/0031 375/259 |
| 2011/0242997 | A1 | 10/2011 | Yin | |
| 2011/0243039 | A1* | 10/2011 | Papasakellariou | H04L 1/1861 370/280 |
| 2011/0268080 | A1* | 11/2011 | Luo | H04L 5/0053 370/330 |
| 2011/0310853 | A1 | 12/2011 | Yin et al. | |
| 2012/0051245 | A1 | 3/2012 | Nam et al. | |
| 2012/0069793 | A1* | 3/2012 | Chung | H04W 76/27 370/315 |
| 2012/0113831 | A1* | 5/2012 | Pelletier | H04L 5/0053 370/252 |
| 2012/0207108 | A1 | 8/2012 | Larsson et al. | |
| 2014/0056273 | A1 | 2/2014 | Jang et al. | |
| 2015/0282158 | A1* | 10/2015 | Chen | H04L 5/0007 370/329 |
| 2016/0095137 | A1* | 3/2016 | Chen | H04L 5/0007 370/329 |

FOREIGN PATENT DOCUMENTS

| | | |
|---|---|---|
| CN | 102959917 | 3/2013 |
| CN | 103828318 | 5/2014 |
| JP | 2013534737 | 9/2013 |
| JP | 2013541873 | 11/2013 |
| JP | 2014082774 | 5/2014 |
| KR | 1020130101502 | 9/2013 |
| WO | 2010148319 | 12/2010 |

OTHER PUBLICATIONS

PCT International Application No. PCT/KR2015/013404, Written Opinion of the International Searching Authority dated Mar. 22, 2016, 19 pages.
European Patent Office Application Serial No. 15868113.0, Search Report dated Jul. 5, 2018, 8 pages.
Canadian Intellectual Property Office Application Serial No. 2,967,281, Office Action dated Mar. 21, 2019, 4 pages.
3rd Generation Partnership Project; Technical Specification Group Radio Access Network; Evolved Universal Terrestrial Radio Access (E-UTRA); Physical layer procedures (Release 8), 3GPP TS 36.213 V8.5.0, Dec. 2008, 69 pages.
The State Intellectual Property Office of the People's Republic of China Application Serial No. 201580066325.2, Office Action dated Jul. 2, 2019, 8 pages.
Japan Patent Office Application No. 2019-031559, Office Action dated Dec. 26, 2019, 3 pages.
Samsung, "HARQ-ACK and RI Multiplexing in PUSCH", R1-105372, 3GPP TSG RAN WG1 #62bis, Oct. 2010, 4 pages.

* cited by examiner

FIG. 5

| 0 | 1 | 2 | | 3 | 4 | 5 | 6 | 7 | 8 | | 9 | 10 | 11 |
|---|---|---|---|---|---|---|---|---|---|---|---|---|---|
| 12 | 13 | 14 | | 15 | 16 | 17 | 18 | 19 | 20 | | 21 | 22 | 23 |
| 24 | 25 | 26 | | 27 | 28 | 29 | 30 | 31 | 32 | | 33 | 34 | 35 |
| 36 | 37 | 0 | | 1 | 2 | 3 | 4 | 5 | 6 | | 7 | 8 | 9 |
| 10 | 11 | 12 | | 13 | 14 | 15 | 16 | 17 | 18 | | 19 | 20 | 21 |
| 22 | 24 | 23 | | 24 | 25 | 26 | 27 | 26 | 28 | | 29 | 25 | 30 |
| 31 | 20 | 20 | | 33 | 23 | 34 | 35 | 22 | 36 | | 21 | 21 | 38 |
| 39 | 16 | 16 | | 19 | 19 | 42 | 43 | 18 | 18 | | 17 | 17 | 46 |
| 47 | 12 | 12 | | 15 | 15 | 50 | 51 | 14 | 14 | | 13 | 13 | 54 |
| 55 | 8 | 8 | | 11 | 11 | 58 | 59 | 10 | 10 | | 9 | 9 | 62 |
| 63 | 4 | 4 | | 7 | 7 | 66 | 67 | 6 | 6 | | 5 | 5 | 70 |
| 71 | 0 | 0 | | 3 | 3 | 74 | 75 | 2 | 2 | | 1 | 1 | 78 |

■ RI   ▨ CQI/PMI   □ U-SCH   ▨ A/N   ▨ RS

FIG. 6

| 0 | 1 | 2 | | 3 | 4 | 5 | 6 | 7 | 8 | | 9 | 10 | 11 |
|---|---|---|---|---|---|---|---|---|---|---|---|---|---|
| 12 | 13 | 14 | | 15 | 16 | 17 | 18 | 19 | 20 | | 21 | 22 | 23 |
| 24 | 25 | 26 | | 27 | 28 | 0 | 1 | 2 | 3 | | 4 | 5 | 6 |
| 7 | 8 | 9 | | 10 | 11 | 12 | 13 | 14 | 15 | | 16 | 17 | 18 |
| 19 | 20 | 21 | | 22 | 23 | 24 | 25 | 26 | 27 | | 28 | 29 | 30 |
| 31 | 32 | 33 | | 34 | 0 | 1 | 2 | 3 | 4 | | 5 | 6 | 7 |
| 8 | 9 | 10 | | 11 | 12 | 13 | 14 | 15 | 16 | | 17 | 18 | 19 |
| 20 | 21 | 22 | | 23 | 24 | 25 | 26 | 27 | 28 | | 29 | 30 | 31 |
| 32 | 33 | 34 | | 35 | 36 | 37 | 38 | 39 | 40 | | 41 | 42 | 43 |
| 44 | 45 | 46 | | 47 | 48 | 49 | 50 | 51 | 52 | | 53 | 54 | 55 |
| 56 | 57 | 58 | | 59 | 60 | 61 | 62 | 63 | 64 | | 65 | 66 | 67 |
| 68 | 69 | 70 | | 71 | 72 | 73 | 74 | 75 | 76 | | 77 | 78 | 79 |

■ RI   ▨ CQI/PMI   □ U-SCH   ▨ A/N   ▨ RS

FIG. 7
| 0 | 1 | 44 |  | 47 | 4 | 5 | 6 | 7 | 46 |  | 45 | 10 | 11 |
|---|---|---|---|---|---|---|---|---|---|---|---|---|---|
| 12 | 13 | 40 |  | 43 | 16 | 17 | 18 | 19 | 42 |  | 41 | 22 | 23 |
| 24 | 25 | 36 |  | 39 | 28 | 0 | 1 | 2 | 38 |  | 37 | 5 | 6 |
| 7 | 8 | 32 |  | 35 | 11 | 12 | 13 | 14 | 34 |  | 33 | 17 | 18 |
| 19 | 20 | 28 |  | 31 | 23 | 24 | 25 | 26 | 30 |  | 29 | 29 | 30 |
| 31 | 32 | 24 |  | 27 | 0 | 1 | 2 | 3 | 26 |  | 25 | 6 | 7 |
| 8 | 9 | 20 |  | 23 | 12 | 13 | 14 | 15 | 22 |  | 21 | 18 | 19 |
| 20 | 21 | 16 |  | 19 | 24 | 25 | 26 | 27 | 18 |  | 17 | 30 | 31 |
| 32 | 60 | 12 |  | 15 | 36 | 37 | 38 | 39 | 14 |  | 13 | 61 | 43 |
| 44 | 56 | 8 |  | 11 | 59 | 49 | 50 | 58 | 10 |  | 9 | 57 | 55 |
| 56 | 52 | 4 |  | 7 | 55 | 61 | 62 | 54 | 6 |  | 5 | 53 | 67 |
| 68 | 48 | 0 |  | 3 | 51 | 73 | 74 | 50 | 2 |  | 1 | 49 | 79 |
 RI    CQI/PMI   ☐ U-SCH    A/N    RS
FIG. 8
| 0 | 1 | 2 |  | 3 | 4 | 5 | 6 | 7 | 8 |  | 9 | 10 | 11 |
|---|---|---|---|---|---|---|---|---|---|---|---|---|---|
| 12 | 13 | 14 |  | 15 | 16 | 17 | 18 | 19 | 20 |  | 21 | 22 | 23 |
| 24 | 25 | 26 |  | 27 | 28 | 0 | 1 | 2 | 3 |  | 4 | 5 | 6 |
| 7 | 8 | 9 |  | 10 | 11 | 12 | 13 | 14 | 15 |  | 16 | 17 | 18 |
| 19 | 60 | 56 |  | 59 | 23 | 24 | 25 | 26 | 58 |  | 57 | 29 | 30 |
| 31 | 52 | 48 |  | 51 | 55 | 1 | 2 | 54 | 50 |  | 49 | 53 | 7 |
| 8 | 44 | 40 |  | 43 | 47 | 13 | 14 | 46 | 42 |  | 41 | 45 | 19 |
| 20 | 36 | 32 |  | 35 | 39 | 25 | 26 | 38 | 34 |  | 33 | 37 | 31 |
| 32 | 28 | 24 |  | 27 | 31 | 37 | 38 | 30 | 26 |  | 25 | 29 | 43 |
| 44 | 20 | 16 |  | 19 | 23 | 49 | 50 | 22 | 18 |  | 17 | 21 | 55 |
| 56 | 12 | 8 |  | 11 | 15 | 61 | 62 | 14 | 10 |  | 9 | 13 | 67 |
| 68 | 4 | 0 |  | 3 | 7 | 73 | 74 | 6 | 2 |  | 1 | 5 | 79 |
 RI    CQI/PMI   ☐ U-SCH    A/N    RS

FIG. 11
| 0 | 1 | 44 | | 47 | 4 | 5 | 6 | 7 | 46 | | 45 | 10 | 11 |
| 12 | 59 | 40 | | 43 | 16 | 17 | 18 | 19 | 42 | | 41 | 60 | 23 |
| 24 | 55 | 36 | | 39 | 58 | 29 | 30 | 57 | 38 | | 37 | 56 | 0 |
| 1 | 51 | 32 | | 35 | 54 | 6 | 7 | 53 | 34 | | 33 | 52 | 12 |
| 13 | 28 | 28 | | 31 | 50 | 17 | 18 | 49 | 30 | | 29 | 48 | 23 |
| 24 | 24 | 24 | | 27 | 27 | 27 | 28 | 26 | 26 | | 25 | 25 | 31 |
| 32 | 20 | 20 | | 23 | 23 | 35 | 36 | 22 | 22 | | 21 | 21 | 39 |
| 40 | 16 | 16 | | 19 | 19 | 43 | 44 | 18 | 18 | | 17 | 17 | 47 |
| 48 | 12 | 12 | | 15 | 15 | 51 | 52 | 14 | 14 | | 13 | 13 | 61 |
| 56 | 8 | 8 | | 11 | 11 | 59 | 60 | 10 | 10 | | 9 | 9 | 57 |
| 64 | 4 | 4 | | 7 | 7 | 67 | 68 | 6 | 6 | | 5 | 5 | 53 |
| 72 | 0 | 0 | | 3 | 3 | 75 | 76 | 2 | 2 | | 1 | 1 | 49 |
 RI    CQI/PMI   U-SCH    A/N    RS

METHOD FOR TRANSMITTING UPLINK CONTROL INFORMATION AND DEVICE THEREFOR

CROSS-REFERENCE TO RELATED APPLICATIONS

This application is the National Stage filing under 35 U.S.C. 371 of International Application No. PCT/KR2015/013404, filed on Dec. 8, 2015, which claims the benefit of U.S. Provisional Application No. 62/089,176, filed on Dec. 8, 2014, 62/096,903, filed on Dec. 26, 2014, 62/112,669, filed on Feb. 6, 2015, 62/132,519, filed on Mar. 13, 2015, 62/204,487, filed on Aug. 13, 2015, 62/207,917, filed on Aug. 21, 2015 and 62/222,176, filed on Sep. 22, 2015, the contents of which are all hereby incorporated by reference herein in their entirety.

TECHNICAL FIELD

The present invention relates to a wireless communication system, and more particularly, to a method and apparatus for transmitting uplink control information.

BACKGROUND ART

Various devices including a smartphone, a tablet PC, and the like requiring M2M (machine-to-machine) communication and high data throughput and technologies are emerging and diffusing. Hence, an amount of data required to be processed in a cellular network is rapidly increasing. In order to satisfy the rapidly increasing data process requirements, a carrier aggregation technique for efficiently using more frequency bands, a cognitive radio technology, a multi-antenna technology for increasing data capacity transmitted in a limitative frequency, a multi-base station cooperative technology, and the like are developing. Moreover, a communication environment is evolving into a way that a density of a node capable of being accessed by a neighboring device is increasing. A node corresponds to a fixed point equipped with one or more antennas to transceive a radio signal with a user device. If a communication system is equipped with a node of high density, the communication system can provide a user device with a communication service of better performance via cooperation between nodes.

A multi-node cooperative communication system performs communication with a user device using the same time-frequency resource in a plurality of nodes. In the multi-node cooperative communication system, since each node operates as an independent base station, the multi-node cooperative communication system has significantly better performance in processing data compared to a legacy communication that performs communication with a user device without mutual cooperation.

The multi-node system performs cooperative communication using a plurality of nodes each of which operates as a base station, an access point, an antenna, an antenna group, a radio remote header (RRH), or a radio remote unit (RRU). Unlike a legacy centralized antenna system that antennas are located in a manner of being concentrated on a base station, in general, a plurality of the nodes are located in a manner of being apart from each other in the multi-node system. One or more base stations or a base station controller can manage a plurality of the nodes to control an operation of each node or schedule data to be transmitted/received by each node. A node is connected with the base station or the base station controller controlling the node via a cable or a dedicated line.

Since the multi-node system is able to communicate with a single user device or a plurality of user devices in a manner that distributed nodes transmit/receive a different stream at the same time, the multi-node system can be regarded as a sort of MIMO (multiple input multiple output) system. However, since the multi-node system transmits a signal using nodes distributed to various positions, a transmission area to be covered by each antenna is reduced compared to antennas installed in the legacy centralized antenna system. Hence, compared to the legacy system used to implement MIMO technique in the centralized antenna system, transmit power for transmitting a signal transmitted by each antenna can be decreased in the multi-node system. And, since a transmission distance between an antenna and a user device is shortened, path loss is reduced and fast transmission of data is enabled. In doing so, transmission capacity and power efficiency of a cellular system can be enhanced and communication performance of uniform quality can be satisfied irrespective of a position of a user device in a cell. Moreover, since the base station(s) and the base station controller(s) connected with a plurality of the nodes are participating in transmitting/receiving data in the multi-node system, a signal loss can be reduced in a transmission process. If nodes apart from each other as much as a prescribed distance perform cooperative communication with a user device, correlation and interference are reduced between antennas. In particular, it may be able to obtain high SINR (signal to interference-plus-noise ratio) through the multi-node cooperative communication system.

Because of the merits of the multi-node system, a next generation mobile communication system uses the multi-node system together with the legacy centralized antenna system or uses the multi-node system instead of the legacy centralized antenna system not only to reduce base station expansion cost and maintenance cost of a backhaul network but also to increase service coverage, channel capacity, and SINR.

DISCLOSURE

Technical Problem

An object of the present invention devised to solve the problem lies An object of the present invention is to provide a method for transmitting uplink control information, for more efficient channel state reporting and proper scheduling according to channel state reporting.

It is to be understood that both the foregoing general description and the following detailed description of the present invention are exemplary and explanatory and are intended to provide further explanation of the invention as claimed.

Technical Solution

The object of the present invention can be achieved by providing a method of transmitting uplink control information in a wireless communication system, the method performed by a terminal and including determining the number of coded symbols according to a payload size of uplink control information to be transmitted and mapping the uplink control information to uplink resources according to the determined number of the coded symbols, wherein the number of the coded symbols is determined according to a parameter selected according to the payload size of the uplink control information to be transmitted.

Additionally or alternatively, the parameter may be selected as a first value when the payload size of the uplink control information to be transmitted is equal to or less than a specific value and may be selected as a second value when the payload size of the uplink control information to be transmitted is greater than the specific value.

Additionally or alternatively, the method may further include receiving the parameter via high layer singling.

Additionally or alternatively, the uplink resource may include a physical uplink shared control channel (PUSCH).

Additionally or alternatively, the uplink control information may include hybrid automatic repeat request (HARQ) ACK or a rank indicator (RI).

Additionally or alternatively, the method may further include determining whether a resource for the uplink control information in the uplink resource is extended or a part of contents of the uplink control information is omitted according to one of a coding rate value calculated based on the payload size of the uplink control information to be transmitted, the number of component carriers configured for the UE, and high layer signaling.

Additionally or alternatively, the method may further include mapping the uplink control information to an uplink resource of a plurality of uplink component carriers when the uplink control information includes information on a plurality of downlink component carriers.

Additionally or alternatively, the method may further include mapping uplink control information on a maximum number of downlink component carriers that do not exceed a maximum payload of an uplink resource to the uplink resource, from an uplink resource with the highest priority among uplink resources of the plurality of uplink component carriers.

Additionally or alternatively, the method may further include receiving information on a downlink component carrier group allocated to each uplink resource according to the number of uplink resources of the plurality of uplink component carriers and mapping the uplink control information to the uplink resource using the received information.

Additionally or alternatively, the method may further include concatenating information on the plurality of downlink component carriers to acquire integration uplink control information and time-first mapping the integration uplink control information to an uplink resource of the plurality of uplink component carriers in a subframe unit.

In another aspect of the present invention, provided herein is a terminal configured to transmit uplink control information in a wireless communication system, the terminal including a radio frequency (RF) unit, and a processor configured to control the RF unit, wherein the processor is configured to determine the number of coded symbols according to a payload size of uplink control information to be transmitted and to map the uplink control information to uplink resources according to the determined number of the coded symbols and the number of the coded symbols is determined according to a parameter selected according to the payload size of the uplink control information to be transmitted.

Additionally or alternatively, the parameter may be selected as a first value when the payload size of the uplink control information to be transmitted is equal to or less than a specific value and may be selected as a second value when the payload size of the uplink control information to be transmitted is greater than the specific value.

Additionally or alternatively, the processor may be configured to receive the parameter via high layer singling.

Additionally or alternatively, the uplink resource may include a physical uplink shared control channel (PUSCH).

Additionally or alternatively, the uplink control information may include hybrid automatic repeat request (HARQ) ACK or a rank indicator (RI).

Additionally or alternatively, the processor may be configured to determine whether a resource for the uplink control information in the uplink resource is extended or a part of contents of the uplink control information is omitted according to one of a coding rate value calculated based on the payload size of the uplink control information to be transmitted, the number of component carriers configured for the UE, and high layer signaling.

Additionally or alternatively, the processor may be configured to map the uplink control information to an uplink resource of a plurality of uplink component carriers when the uplink control information includes information on a plurality of downlink component carriers.

Additionally or alternatively, the processor may be configured to map uplink control information to a maximum number of downlink component carriers that do not exceed a maximum payload of an uplink resource to the uplink resource, from an uplink resource with the highest priority among uplink resources of the plurality of uplink component carriers.

Additionally or alternatively, the processor may be configured to receive information on a downlink component carrier group allocated to each uplink resource according to the number of uplink resources of the plurality of uplink component carriers and to map the uplink control information to the uplink resources using the received information.

Additionally or alternatively, the processor may be configured to concatenate information on the plurality of downlink component carriers and acquire integrated uplink control information and to time-first map the integrated uplink control information to an uplink resource of the plurality of uplink component carriers in a subframe unit.

It is to be understood that both the foregoing general description and the following detailed description of the present invention are exemplary and explanatory and are intended to provide further explanation of the invention as claimed.

Advantageous Effects

According to an exemplary embodiment of the present invention, uplink control information may be effectively transmitted.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates an example of resource mapping of uplink control information (UCI);

FIG. 6 illustrates an example of resource mapping of UCI according to an exemplary embodiment of the present invention;

FIG. 7 illustrates an example of resource mapping of UCI according to an exemplary embodiment of the present invention;

FIG. 8 illustrates an example of resource mapping of UCI according to an exemplary embodiment of the present invention;

FIG. 9 illustrates an example of resource mapping of UCI according to an exemplary embodiment of the present invention;

FIG. 10 illustrates an example of resource mapping of UCI according to an exemplary embodiment of the present invention;

FIG. 11 illustrates an example of resource mapping of UCI according to an exemplary embodiment of the present invention;

FIG. 14 illustrates an example of resource mapping of UCI according to an exemplary embodiment of the present invention;

FIG. 15 illustrates an example of resource mapping of UCI according to an exemplary embodiment of the present invention;

BEST MODE

Figure 1:
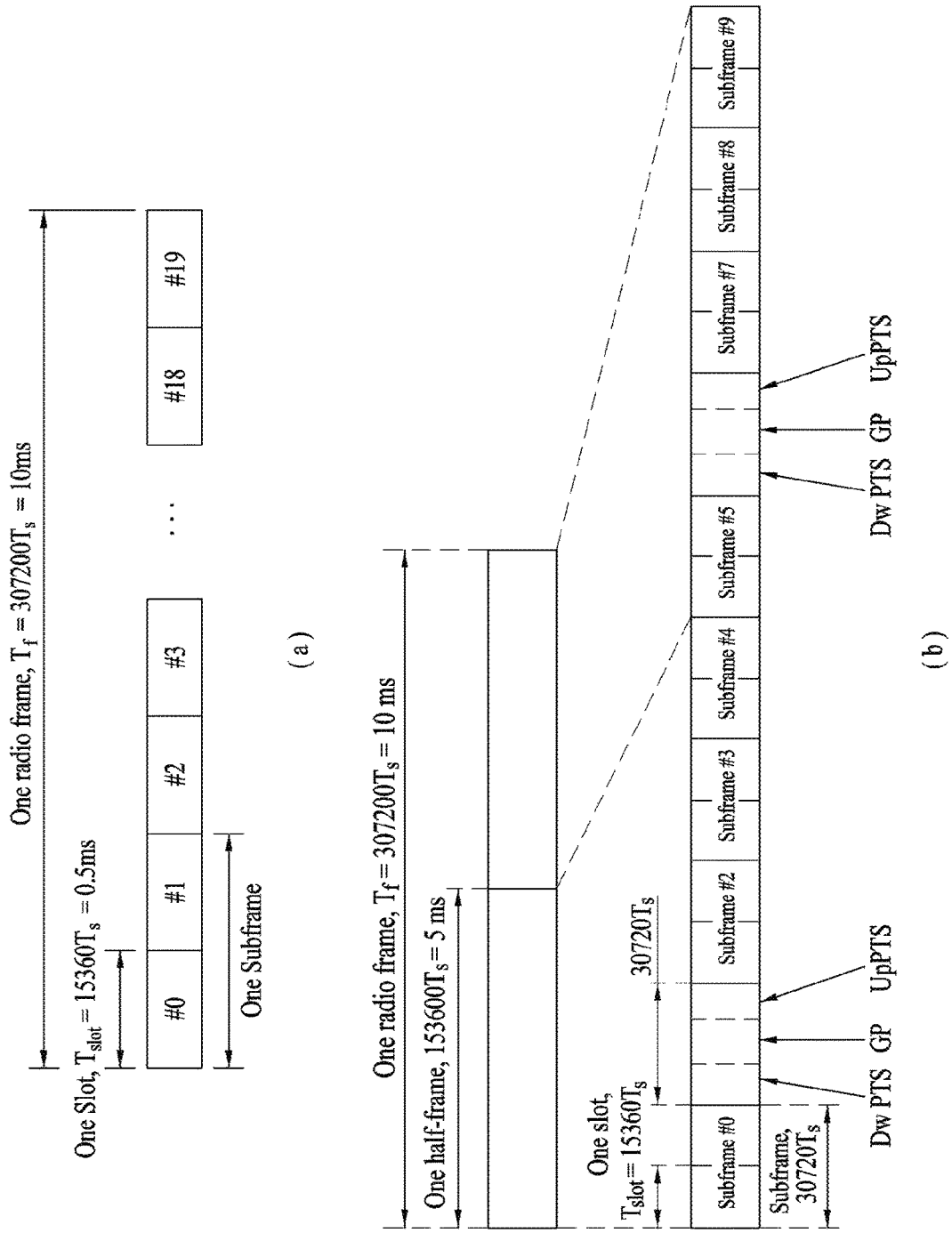
FIG. 1 illustrates an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
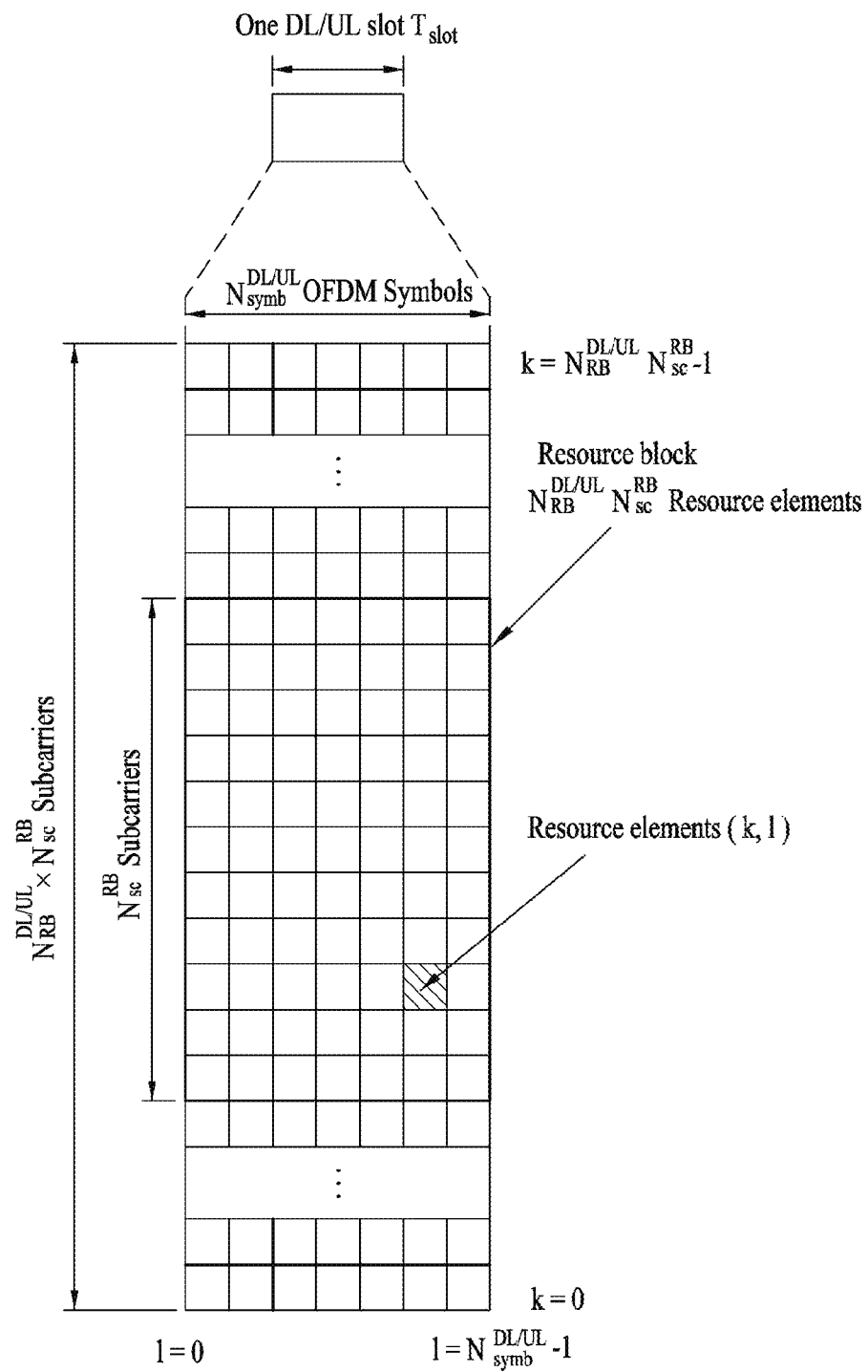
FIG. 2 illustrates an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null sub-carriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
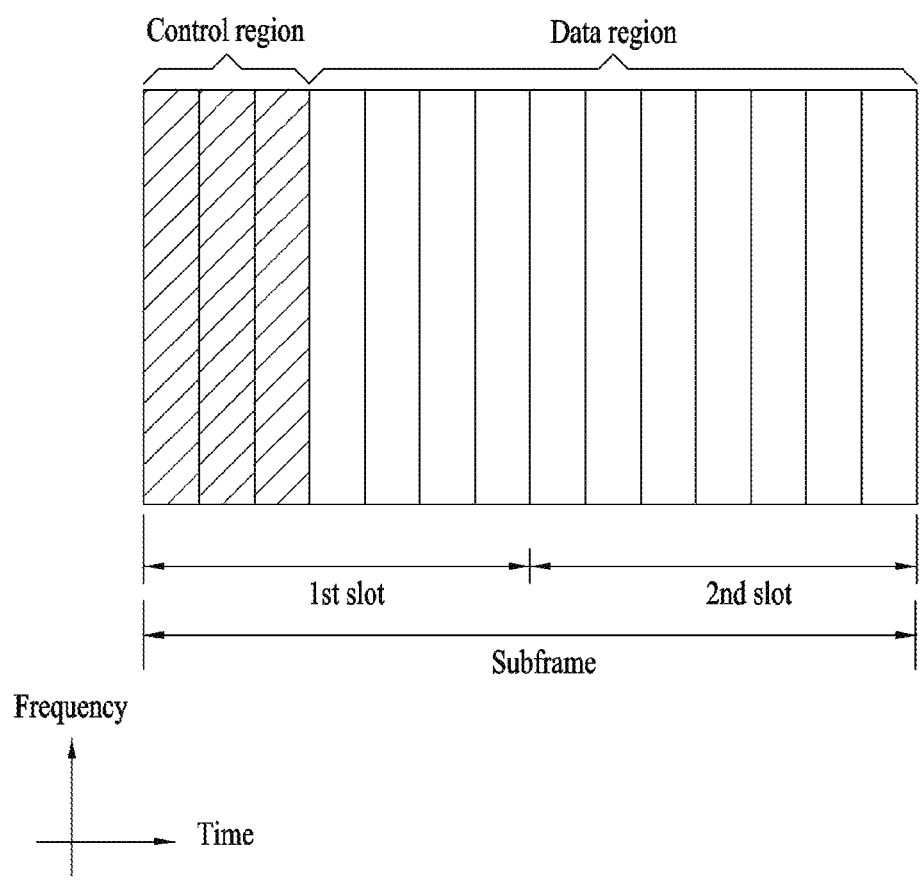
FIG. 3 illustrates an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
| --- | --- | --- | --- |
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
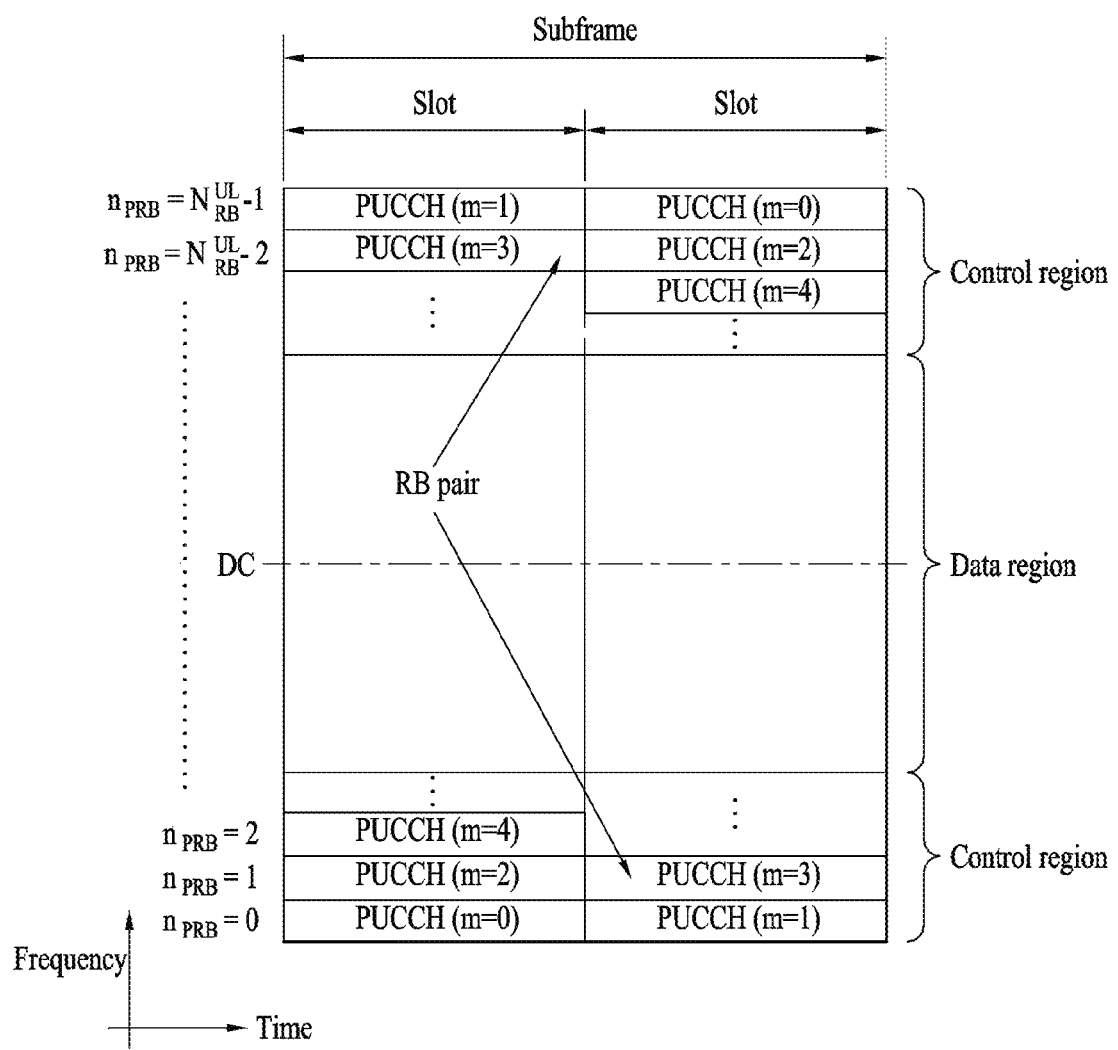
FIG. 4 illustrates an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI (4 bit) 2nd wideband CQI (4 bit) if RI>1 N * Subband PMI (4 bit) (N is the total # of subbands) (if 8Tx Ant, N * subband W2 + wideband W1) |
| | UE selected (Subband CQI) | Mode 2-0 RI (only for Open-loop SM) 1st wideband CQI (4 bit) + Best-M CQI (2 bit) (Best-M CQI: An average CQI for M SBs selected from | | Mode 2-2 RI 1st wideband CQI (4 bit) + Best-M CQI (2 bit) 2nd wideband CQI (4 bit) + Best-M CQI (2 bit) if RI>1 Best-M index (L |

TABLE 6-continued

| | | PMI Feedback Type | | |
|---|---|---|---|---|
| | | No PMI | Single PMI | Multiple PMIs |
| | | among N SBs) Best-M index (L bit) | | bit) Wideband PMI(4 bit) + Best-M PMI (4 bit) (if 8Tx Ant, wideband W2 + Best-M W2 + wideband W1) |
| Higher Layer-configured (Subband CQI) | | Mode 3-0 RI (only for Open-loop SM) 1st wideband CQI (4 bit) + N * subband CQI (2 bit) | Mode 3-1 RI 1st wideband CQI (4 bit) + N * subbandCQI(2 bit) 2nd wideband CQI (4 bit) + N * subbandCQI(2 bit) if RI>1 Wideband PMI (4 bit) (if 8Tx Ant, wideband W2 + wideband W1) | Mode 3-2 RI 1st wideband CQI (4 bit) + N * subbandCQI(2 bit) 2nd wideband CQI (4 bit) + N * subbandCQI(2 bit) if RI>1 N * Subband PMI (4 bit) (N is the total # of subbands) (if 8Tx Ant, N * subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

The present invention proposes a method of piggybacking uplink control information (UCI) of a plurality of CCs on a UL data channel, e.g., a physical uplink shared channel (PUSCH) when a massive carrier aggregation (CA) scheme supporting aggregation of the CCs is supported in a wireless communication system In an evolved wireless communication system such as a 3GPP LTE system, characteristics of information in UL are divided into UCI and data and a PUCCH, which is a channel for transmitting the UCI, and a PUSCH, which is a channel for transmitting the data, are designed according to the characteristics of information. However, in a situation in which the UE is not configured to simultaneously transmit the PUCCH and PUSCH, if PUSCH transmission is present at a timing when the UCI should be transmitted, the UE piggybacks the UCI on the PUSCH being transmitted. FIG. 5 illustrates a scheme of mapping details of UCI, that is, ACK/NACK, a rank indicator (RI), a channel quality indicator (CQI)/precoding matrix indicator (PMI), in a resource region when the UCI is transmitted on a PUSCH in a normal CP. FIG. 5 illustrates the case in which a PUSCH resource is allocated in one RB in an LTE system according to an embodiment of the present invention, wherein a horizontal axis represents a single carrier frequency division multiple access (SC-FDMA) symbol and a vertical axis represents a subcarrier. In this case, a time index of the SC-FDMA symbol increases from a left to right direction and a frequency index of the subcarrier increases from a top to down direction. In addition, different shaded regions are indicated according to types of the UCI and numbers in the same region denote mapping orders of coded symbols.

In this case, CQI/PMI is mapped without considering a resource location of ACK/NACK. Accordingly, if ACK/NACK occupies all SC-FDMA symbols, CQI/PMI in corresponding locations in FIG. 5 is punctured.

In an LTE Rel-10 system, a carrier aggregation (CA) technology for transmitting DL data to the UE by combining up to 5 CCs has been considered. However, in LTE Rel-13, a massive CA scheme of extending the number of CCs up to 8 or 16 has been discussed for the purpose of supporting the amount of DL traffic that is rapidly increased recently. In this case, when the number of CCs supported in the CA scheme is increased, the amount of UCI is proportionally increased and PUSCH resources for UCI transmission may be insufficient. Accordingly, the present invention proposes a method of piggybacking UCI to the PUSCH by extending a resource region for transmitting UCI in the PUSCH resource when massive CA scheme is supported. Hereinafter, although a step of an LTE system is described with regard to a detailed exemplary embodiment of the present invention, the present invention may be applied to an arbitrary wireless communication system for transmitting UCI using a data channel.

Condition of Determining Whether UCI Resource in PUSCH Needs to be Extended or Some UCI Needs to be Omitted Coding Rate Reference of ACK/NACK According to a detailed exemplary embodiment of the present invention, when an ACK/NACK bit as a transmission target is a $B_{ACK/NACK}$ bit, a modulation order according to currently allocated MCS (or to be applied to transmission of ACK/NACK) with respect to a PUSCH resource is $Q_m$, a maximum coded symbol number to be allocated for ACK/NACK in a PUSCH resource is $N_{ACK/NACK}$, $C_{ACK/NACK}$ may be defined according to the following equation.

$$C_{ACK/NACK} = B_{ACK/NACK}/(Q_m \cdot N_{ACK/NACK}) \quad [\text{Equation 1}]$$

The present invention proposes a method of extending a UCI resource in a PUSCH or omitting some UCI when the $C_{ACK/NACK}$ is greater than a preset threshold value $C_0$ and using an existing PUSCH resource when the $C_{ACK/NACK}$ is smaller than the threshold value.

In an LTE system according to an exemplary embodiment of the present invention, when a step is performed based on time duplex division (TDD), asymmetric subframes, i.e., a DL subframe and a UL subframe may be determined to have different numbers according to UL/DL (subframe) configuration. In general, according to the characteristics of traffic, DL subframes may be set with a higher number than the number of UL subframes and a UE may need to perform UCI transmission on a plurality of DL subframes at a specific UL timing according to the asymmetric structure. In order to adjust a payload case of the above case, an LTE system supports an ACK/NACK bundling scheme for forming a single value by applying a logical signal AND operation to a plurality of ACK/NACK.

In this case, when ACK/NACK bundling is indicated to a UE according to configuration of a UE, the $B_{ACK/NACK}$ may be interpreted as an ACK/NACK to be transmitted after ACK/NACK bundling is applied. That is, first, whether ACK/NACK bundling is performed according to configuration of an eNB may be determined and, then, second, whether a PUSCH resource for transmission of ACK/NACK is extended may be determined using an ACK/NACK bit to be transmitted as one parameter.

In a situation in which bundling is set not to be applied to ACK/NACK transmission through a PUCCH, bundling may also be applied to ACK/NACK transmission through a PUSCH and whether UCI in the PUSCH is extended or UCI is transmitted to the following multiple PUSCH may be lastly determined based on an ACK/NACK bit number to which the bundling is applied. For example, when an ACK/NACK bit number of the case in which bundling is not applied is defined as $B_{w/o\text{-}bundling}$ and an ACK/NACK bit number of the case in which bundling is applied is defined as $B_{with\text{-}bundling}$, whether bundling is applied to ACK/NACK and whether UCI in PUSCH is extended or whether UCI is transmitted to multiple PUSCH may be determined through the following procedure.

Step 1: When a $C_{ACK/NACK}$ (or $N_{ACK/NACK}$) value calculated based on $B_{w/o\text{-}bundling}$ is equal to or less than a threshold value $C_0$ (or threshold value $N_0$ corresponding to $N_{ACK/NACK}$), non-bundled ACK/NACK may be transmitted in the same PUSCH piggyback method as a conventional method and, when the $C_{ACK/NACK}$ (or $N_{ACK/NACK}$) value calculated based on $B_{w/o\text{-}bundling}$ is greater than the threshold value, ACK/NACK bundling may be applied and Step 2 below is performed.

As another method, when the number of ACK/NACK transmission symbols calculated based on $B_{w/o\text{-}bundling}$ is equal than to or less N (e.g., N=4), non-bundled ACK/NACK may be transmitted using the same PUSCH piggyback method as a conventional method and when the number of ACK/NACK transmission symbols calculated based on $B_{w/o\text{-}bundling}$ is greater than N, ACK/NACK bundling may be applied and Step 2 may be performed.

Step 2: When a $C_{ACK/NACK}$ (or $N_{ACK/NACK}$) value calculated based on $B_{with\text{-}bundling}$ is equal to or less than a threshold value, bundled ACK/NACK may be transmitted in the same PUSCH piggyback method as a conventional method and, when the $C_{ACK/NACK}$ (or $N_{ACK/NACK}$) value calculated based on $B_{with\text{-}bundling}$ is greater than the threshold value, the proposed UCI expansion in a PUSCH or multiple PUSCH may be applied.

As another example, when the number of ACK/NACK transmission symbols calculated based on $B_{with\text{-}bundling}$ is equal than to or less N (e.g., N=4), bundled ACK/NACK may be transmitted using the same PUSCH piggyback method as a conventional method and when the number of ACK/NACK transmission symbols calculated based on $B_{with\text{-}bundling}$ is greater than N, the proposed UCI expansion in a PUSCH or multiple PUSCH may be applied.

When UCI is piggybacked in a PUSCH resource in an LTE system according to an exemplary embodiment of the present invention as illustrated in FIG. 5, a coded modulation symbol number for ACK/NACK or RI may correspond to a maximum of four SC-FDMA symbols in an allocated PUSCH resource. For example, in the case of normal CP and 1RB PUSCH, 48(=4*12) REs may be a coded modulation symbol number for ACK/NACK or RI. On the other hand, a coded modulation symbol number for CQI/PMI may be obtained by subtracting an RI resource from a maximum of all PUSCH resources. From the above point of view, lack of resources in a PUSCH due to increase in UCI may become more serious in ACK/NACK or RI than in CQI/PMI and, in general, ACK/NACK has higher priority than CSI (e.g., RI and CQI/PMI) and, thus, whether UCI resources in a PUSCH are extended or some UCI is omitted based on ACK/NACK may be determined.

As one method, a modulation order $Q_m$ according to a current modulation and coding scheme (MCS) in a PUSCH resource is assumed and, in this case, whether a minimum coding rate achievable via ACK/NACK is proper may be monitored.

Reference for Coding Rate for ACK/NACK under Assumption of Transmission of PUCCH Resource The present invention proposes the following method as an additional step. When an eNB sets a specific PUCCH resource as a reference to a UE and the UE performs UCI piggyback through a PUSCH resource, the UE may compare a minimum coding rate $C_1$ for ACK/NACK during transmission of ACK/NACK using an allocated PUSCH resource and a coding rate $C_2$ for ACK/NACK during transmission of ACK/NACK using a PUCCH resource that is set to a reference by the eNB (e.g., calculate a ratio between $C_1$ and $C_2$ and a difference between $C_1$ and $C_2$), 1) when the result is greater than a threshold value $\Delta C_0$ that is set by the eNB or pre-defined, a UCI resource in a PUSCH may be extended, UCI may be transmitted over a plurality of PUSCHs, another PUSCH may be selected and the above procedure may be re-transmitted, UCI may be transmitted using a PUCCH, or a UCI size may be reduced (e.g., some UCI is omitted) and 2) in other cases (i.e., when the corresponding result value is less than the threshold value $\Delta C_0$), the same UCI piggyback method as a conventional method may be applied without a change.

As a simple example, when $C_1$ is greater than $C_2$, the above step 1) may be applied and, in other cases (i.e., when $C_1$ is less than $C_2$), the existing step 2) may be applied.

For example, in the above step, $C_1$ and $C_2$ may be defined according to the following equation.

$$C_1 = B_{ACK/NACK}/(Q_{PUSCH,m} \cdot N_{PUSCH,A/N})$$

$$C_2 = B_{ACK/NACK}/(Q_{PUCCH,m} \cdot N_{PUCCH,A/N}) \quad \text{[Equation 2]}$$

Here, $B_{ACK/NACK}$ refers to a payload size (bit number) of ACK/NACK to be transmitted and $Q_{PUSCH,m}$ and $Q_{PUCCH,m}$ refer to a modulation order according to a currently allocated MCS (or a modulation order to be applied to ACK/NACK transmission) with respect to a PUSCH resource and a modulation order applied in a PUCCH resource that is set to a reference by the eNB, respectively. Similarly, $N_{PUSCH,A/N}$ and $N_{PUCCH,A/N}$ refer to a maximum coded symbol number to be allocated for ACK/NACK transmission in a PUSCH resource and a maximum coded symbol number to be allocated for ACK/NACK transmission in a PUCCH resource that is set to a reference by the eNB, respectively.

According to the above step, when the UE transmits UCI to a PUSCH resource via piggyback, if a UCI coding rate in a PUSCH resource that is currently allocated based on a UCI coding rate in a PUCCH resource as a UCI dedicated feedback container is smaller than a UCI coding rate in a PUCCH resource, UCI transmission may be determined to be reliable and the existing method 2) may be applied and, in other cases, the above step 1) may be applied to enhance the reliability of UCI transmission.

Coding Rate Reference for ACK/NACK Under Assumption of Maximum Coding Symbol Number The present invention proposes the following method as an additional step. During UCI piggyback in a PUSCH resource, a UE may compare a maximum coded symbol number $C_1$ (e.g., $4 \cdot M_{sc}^{PUSCH}$) (or minimum coding rate under assumption of this limit) to be used for UCI transmission in the PUSCH resource and a coded symbol number $C_2$ (e.g., $\tilde{Q}$ of Equation 3 below) (or coding rate under assumption of this) determined as one or more combinations of (i), (ii), (iii), and (iv) (e.g., calculate a ratio between $C_1$ and $C_2$ and a difference between $C_1$ and $C_2$), when the result is greater than a threshold value $\Delta C_{0\_}$ that is set by the eNB or pre-defined, the above step 1) may be applied and, in other cases (i.e., when the result is smaller than the threshold value $\Delta C_0$), the existing step 2) may be applied.

(i) UCI payload size (e.g., UCI bit number)

(ii) Allocated PUSCH resource amount (e.g., PUSCH PRB number)

(iii) Modulation order applied to allocated PUSCH resource (or UCI)

(iv) Transport block size (TBS) bit amount to be transmitted in allocated PUSCH resource For example, when a PUSCH transmits one transport block (TB) in an LTE system, $C_1$ and $C_2$ may be defined according to the following equation.

$$C_1 = \frac{O}{Q_m \cdot 4 \cdot M_{sc}^{PUSCH}} \quad \text{[Equation 3]}$$

$$C_2 = \frac{O}{Q_m \cdot \tilde{Q}}$$

$$\tilde{Q} = \left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil$$

where O is a UCI payload size, $Q_m$ is a modulation order applied to UCI, $M_{sc}^{PUSCH\ initial}$ is the number of subcarriers of an allocated PUSCH resource in the frequency PUSCH-initial domain, $N_{symb}^{PUSCH-initial}$ is the number of SC-FDMA symbols to which the PUSCH resource is PUSCH allocated, $K_r$ is the number of bits transmitted in an r-th code block, $\beta_{offset}^{PUSCH}$ denotes a design parameter, and ⌈ ⌉ denotes a ceiling symbol.

Although the above steps according to the aforementioned exemplary embodiments have been described based on ACK/NACK for convenience, the same principle may also be applied in consideration of a coding rate of each UCI with respect to UCI (e.g., RI and CQI/PMI) other than ACK/NACK.

Configured CC Number Reference

A detailed embodiment of the present invention proposes a method of extending a UCI resource in a PUSCH or omitting some UCI when the number $N_{CC}$ of CCs set to a UE is greater than $N_0$ and using an existing PUSCH resource when the number $N_{CC}$ of CCs set to a UE is smaller than No. In this case, $N_0$ may be pre-defined or preset by an eNB.

The aforementioned step according to the "coding rate reference for ACK/NACK" may flexibly extend a PUSCH resource in that a current modulation order and a currently allocated resource amount are applied. However, the complexity of the corresponding step may be increased in terms of a UE and, accordingly, the present invention proposes a method of extending a UCI resource in a PUSCH or omitting some UCI when the number of CCs set to a corresponding UE is greater than a number that is predefined or preset by an eNB based on the number of the CCs, as a more simple method.

Alternatively, whether the UCI resource is extended or some UCI is omitted may be determined according to at least one or one or more combinations of the above proposed parameters $N_{CC}$, $B_{ACK/NACK}$, $N_{ACK/NACK}$, and $Q_m$.

High Layer Signaling Reference

A detailed embodiment of the present invention proposes a method of setting to a high layer signal whether a UCI resource in a PUSCH is extended by an eNB to a UE.

As a more detailed form of the "set CC number reference" step, a method of applying a high layer signal to extend a UCI resource in a PUSCH to a UE by an eNB may be considered.

The above all methods may be applied similarly when whether UCI is transmitted to a multiple PUSCH is determined, which will be described below, and, in this case, the parameters $N_{ACK/NACK}$ and $Q_m$ (and/or $B_{ACK/NACK}$) may be calculated based on a PUSCH with highest priority.

Method of Extending UCI Resource in PUSCH or Omitting Some UCI

ACK/NACK Resource Extension and RI Mapping Change

A detailed embodiment of the present invention proposes a method of defining a maximum resource region $S_{ACK/NACK}$ for newly extended ACK/NACK as a union of $S_1$ and $S_2$ and defining and sharing a maximum resource region $S_{CSI}$ as a union of $S_2$ and $S_3$ for RI and CQI/PMI in order to extend a resource region in a PUSCH for UCI when maximum resource regions for ACK/NACK, RI, and CQI/PMI in a PUSCH resources are present as $S_1$, $S_2$, and $S_3$, respectively.

As seen from FIG. 5, in an LTE system according to an exemplary embodiment of the present invention, a maximum transmission resource region $S_1$ for ACK/NACK is #2, #4, #9, and #11 SC-FDMA symbols, a maximum transmission resource region $S_2$ for RI is #1, #5, #8, and #12 SC-FDMA symbols, and a maximum transmission resource region $S_3$ for CQI/PMI the remaining REs obtained excluding REs allocated for RI transmission among remaining REs except for REs in a PUSCH resource. However, when the amount of UCI to be reported using a massive CA scheme is increased, a resource for ACK/NACK may be preferentially ensured and, as one method, a method of converting a resource region for RI transmission as a resource region for ACK/NACK transmission and transmitting RI together to a transmission region for CQI % PMI transmission may be considered.

Hereinafter, a detailed example of ACK/NACK resource extension and RI mapping change will be proposed.

(a) Definition of $S_{CSI}$ and Mapping Order of Coded Symbols of RI and CQI/PMI As one example, $S_{CSI}$ may be a region obtained by excluding RSs in an allocated PUSCH resource region as illustrated in FIG. 6. In this case, mapping of RI and CQI/PMI may be performed using a time-first method of allocating a coded symbol of RI with an increased time index from a minimum value of the time index and a minimum value of a frequency index in the $S_{CSI}$ as a start point, increasing the frequency index by one when the time index has a maximum value, and re-allocating the coded symbol while increasing the time index from the minimum value of the time index and, then, a coded symbol of CQI/PMI may be mapped using the time-first method. FIG. 6 illustrates a mapping order according to the above method.

(b) Definition of $S_{ACK/NACK}$ and Mapping Order of Coded Symbol of ACK/NACK

As one example, $S_{ACK/NACK}$ may be two SC-FDMA symbols of both sides of RSs in an allocated PUSCH resource region, i.e., total eight SC-FDMA symbols, as illustrated in FIG. 7. In this case, as illustrated in FIG. 7, with regard to coded symbols of ACK NACK, when a SC-FDMA symbol adjacent to an RS has priority and a frequency index has a minimum value while coded symbols are allocated while the frequency index is reduced from a maximum value of the frequency index as a start point, a coded symbol may be allocated in the same method in an SC-FDMA symbol with next priority. In this case, when a coded symbol of RI or CQI/PMI is allocated to an RE in which a coded symbol of ACK/NACK is allocated, a coded symbol of ACK/NACK is allocated while RI or CQI/PMI of a corresponding location is punctured. FIG. 7 illustrates an example of extending an ACK/NACK resource when allocation of RI and CQI/PMI of FIG. 6 is allocated.

Alternatively, in order to alleviate puncturing of CSI via allocation of ACK/NACK, ACK/NACK may be allocated to an extended resource region using a time-first method, as illustrated in FIG. 8.

In this case, when an ACK/NACK (or RI) resource region is extended to transmit much bits of ACK/NACK (or RI) are capable of being transmitted through a PUSCH, CRC of the ACK/NACK (or RI) may be additionally contained and transmitted.

Setting of Separate SC-FDMA Symbol for ACK/NACK Resource

A detailed embodiment of the present invention proposes a method of additionally setting a specific SC-FDMA symbol and using the symbol as a resource region for ACK/NACK in order to define a maximum resource region for ACK/NACK in a PUSCH resource in terms of an SC-FDMA symbol and to extend a resource region in a PUSCH for UCI.

According to the step according to "ACK/NACK resource extension and RI mapping change" proposed according to the present invention may extend a resource for ACK/NACK transmission in a PUSCH resource by determining that priority of RI is lower than ACK/NACK and converting a resource of RI into a resource for ACK/NACK. However, even if a resource for ACK/NACK transmission is extended, an eNB may set a separate SC-FDMA symbol to a UE via a high layer signal such as RRC to extend a resource for ACK/NACK in order to protect priority of CQI/PMI of RI.

Figures 9, 10:
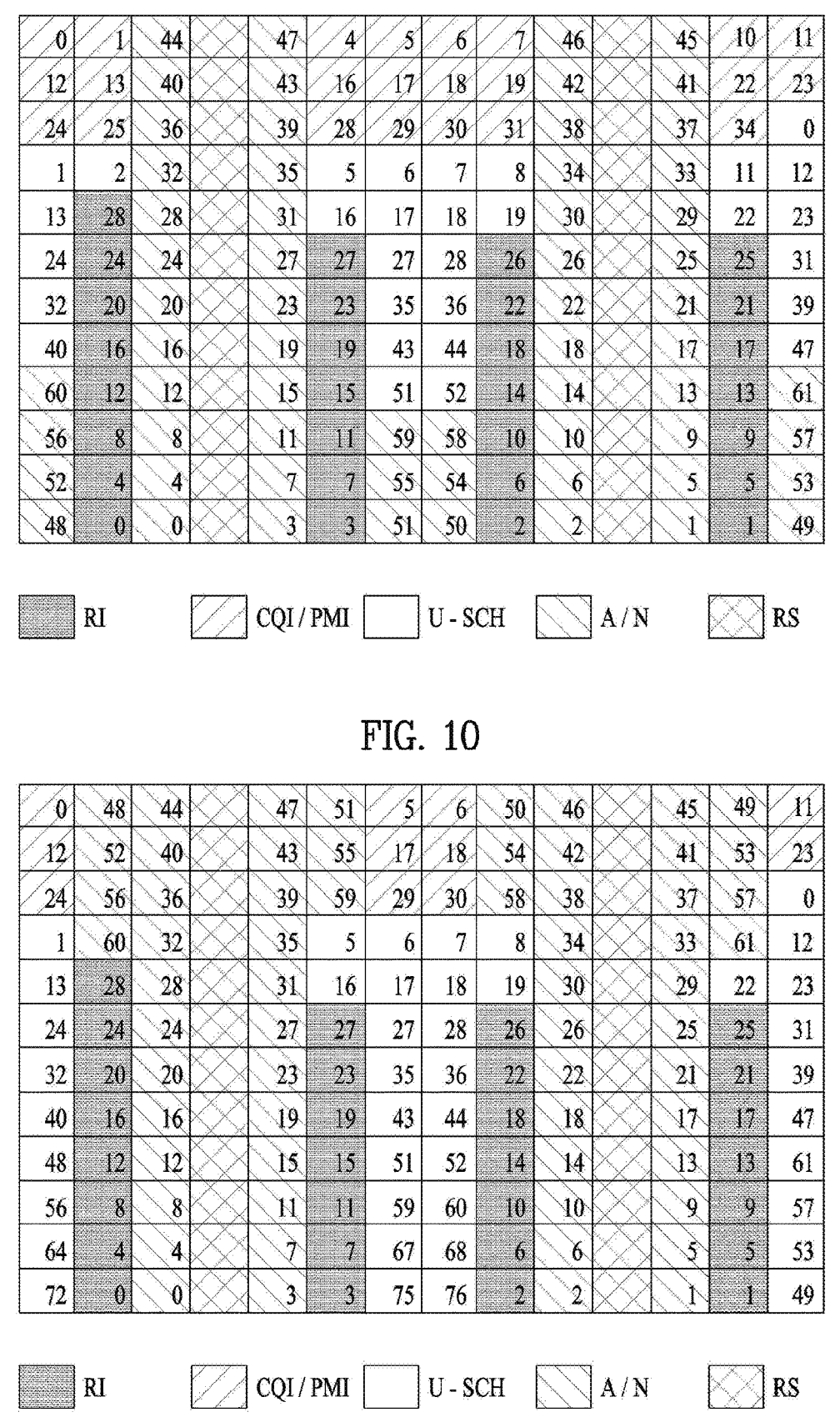

FIG. 9 proposes a method of additionally using #0, #6, #7, and #13 SC-FDMA symbols for ACK/NACK transmission as a detailed example of ACK/NACK resource extension. However, in this case, differently from the step according to "ACK/NACK resource extension and RI mapping change", RI mapping may not be changed from an existing method.

In this case, as illustrated in FIG. 9, when a last OFDM symbol is set to an extended ACK/NACK resource region, a UE may perform a step of excluding a corresponding OFDM symbol from an extended ACK/NACK resource in a subframe in which a sounding referencing signal (SRS) is transmitted. In addition, in a specific situation (e.g., when a PUSCH resource is allocated to a region outside a sell-specific SRS bandwidth), when the UE may not semi-statically be allocated the extended ACK/NACK resource region and may dynamically determine the extended ACK/NACK resource region based on the MCS and resource region indicated by an eNB, the extended ACK/NACK resource region is not always required and, thus, when ACK/NACK to be transmitted in a specific subframe requires an extended resource region and SRS transmission is set in a corresponding subframe, the UE may be operated so as not to transmit SRS with preferential ACK/NACK.

The specific SC-FDMA symbol added for ACK/NACK may be a SC-FDMA symbol in which existing RI is piggybacked and, in this case, REs for allocating a coded symbol for RI may be punctured during allocation of a coded symbol for ACK/NACK. However, in this case, in an order for mapping of coded symbols for ACK/NACK in an extended SC-FDMA symbol, mapping may be started from a minimum point of a frequency index, which is an opposite order to RI. FIG. 10 illustrates the above example. In this case, when a coded symbol is allocated to a portion to which a coded symbol of ACK/NACK is allocated, ACK/NACK may be allocated while RI of a corresponding location is punctured.

As an additional method of extending a resource for ACK/NACK transmission using the specific SC-FDMA symbol, a SC-FDMA symbol in which RI is transmitted may be extended as a resource for ACK/NACK transmission and rate may be performed on REs to which a coded symbol for RI is allocated. For example, as illustrated in FIG. 11, when a coded symbol for ACK/NACK exceeds an existing resource region (e.g., four SC-FDMA symbols) for ACK/NACK transmission, coded symbols for ACK/NACK that is not allocated to an existing resource region may be sequentially allocated after coded symbols for RI are allocated in a resource region for RI transmission. As described above, coded symbols for ACK/NACK allocated to resources other than the existing resource region are allocated after a transmission resource for RI so as to protect RI and when coded symbols for ACK/NACK that is allocated to an additionally extended resource region or coded symbols for RI are not many, puncturing of CQI/PMI may be alleviated.

Method of Omitting UCI for Some CC

CSI Omitting Method

A detailed embodiment of the present invention proposes the following method. When an eNB sets ACK/NACK, RI, and CQI/PMI to be transmitted to a PUSCH to a UE using UCI for a plurality of CCs and a transmission resource region for ACK/NACK is extendable, if one or more of the following conditions (a), (b), (c), and (d) are satisfied, (a) when a coding rate $C_{RI}$ (or $C_{CQI/PMI}$) for RI (or CQI/PMI) is given according to Equation 4 below (or Equation 5 below) in consideration of a puncturing effect using a coded symbol of ACK/NACK, the coding rate is lower than a threshold value that is preset by an eNB.

$$C_{RI}=B_{RI}/(Q_m \cdot (N_{RI}-N_{RI,P}))$$ [Equation 4]

In addition, $$C_{CQI/PMI}=B_{CQI/PMI}/(Q_m \cdot (N_{CQI/PMI}-N_{CQI/PMI,P}))$$ [Equation 5]

Here, $B_{RI}$ and $B_{CQI/PMI}$ refer to payload sizes of RI and CQI/PMI, respectively, $N_{RI}$ and $N_{CQI/PMI}$ refer to maximum RE numbers for RI and CQI/PMI transmission, respectively. $N_{RI,P}$ and $N_{CQI/PMI,P}$ refer to the numbers of REs for RI and CQI/PMI that are punctured by a coded symbol of ACK/NACK, respectively, and $Q_m$ refers to a modulation order according to an MCS level of a PUSCH.

(b) when a resource region for ACK/NACK transmission is extended according to one or more of the aforementioned references (c) when CC number $N_{CC}$ set by a UE is greater than $N_0$ that is preset or preset by an eNB (d) when an eNB sets RI (or CQI/PMI)) to be excluded in a PUSCH as a high layer signal to a UE, The UE excludes some CSI from UCI to be transmitted by a UE. In more detail, when (i) RI and CQI/PMI may be excluded from UCI transmission, (ii) CQI/PMI may be excluded from UCI transmission, or (iii) CQI/PMI is divided into content about a wideband and content about a subband, the content about the subband may be excluded from UCI transmission.

The amount of UCI to be transmitted using a massive CA scheme or the like and, thus, when a transmission resource for ACK/NACK needs to be extended, a step of simultaneously transmitting ACK/NACK, RI, and CQI/PMI in one PUSCH may not be effective. For example, when a resource region for ACK/NACK transmissions is extended according to a step according to the present invention, coded symbols of RI and CQI/PMI may be more frequently punctured via a procedure of allocating a coded symbol of ACK/NACK according to priority of ACK/NACK, as illustrated in FIGS. 7, 8, and 10. Accordingly, when an ACK/NACK resource is extended as described above, a method of omitting all or some (e.g., CQI/PMI obtained by excluding RI) of CSIs may be considered in consideration of a puncturing effect. For example, when resources occupied by ACK/NACK exceed N symbols (e.g., N=4), transmission of all or some of CSIs may be omitted.

Method of Omitting ACK/NACK

Blind Decoding and CRC-Based CC Group Setting

A detailed embodiment of the present invention proposes the following method. When an eNB sets $N_{CC}$ component carriers (CCs) to a UE, the eNB may additionally set a set $S=\{N_0, N_1, N_2 \ldots, N_M\}$ previously or a high layer signal among a total of $N_{CC}$ CCs to the UE and the UE may define a payload size for ACK/NACK transmission in consideration of specific $N_k$ CCs in the set S, define a CRS masking code indicating $N_k$ CCs to be selected among the total of $N_{CC}$ CCs and, then, transmit ACK/NACK for the $N_k$ CCs and CRC-masked CRC together. In this case, the eNB may perform blind detection on ACK/NACK transmitted by the UE and assume ACK/NACK for non-selected CCs as NACK/DTX under the assumption of the set S.

An LTE system according to a detailed embodiment of the present invention may be designed to transmit all ACK/NACK signals for CCs set to the UE even if scheduling is not performed in reality during transmission of ACK/NACK through a PUSCH in order to consider the case in which ambiguity such as PDCCH missing and activation/deactivation signal missing occurs. However, even if the eNB sets, for example, a maximum of 8 or 16 CCs according to a massive CA scheme, the possibility that scheduling for all CCs is applied to one UE is expected to be small in reality. Accordingly, even if a total of $N_{CC}$ CCs are set, most CCs may refer to DTX without scheduling.

Accordingly, according to the present invention, when a method of adding CRC is considered due to a sufficient large ACK/NACK size, an eNB may preset a set of the number of available CCs to a UE and the UE may select one value from the set number of the CCs, determine a payload of the UE, and transmit ACK/NACK along with CRC. In this case, the CRC may be masked with a CRS masking code of a CC set and the eNB may recognize a CRS masking code and a payload size that are transmitted by the UE via blind detection. In this case, the payload size may directly indicate the number of CCs in which ACK/NACK is transmitted and may interpret the CRS masking code in the CC number so as to detect a CC set in which ACK/NACK is transmitted. In addition, the UE may additionally information on the CC set along with ACK/NACK information. The eNB may assume NACK/DTX with respect to ACK/NACK for CCs that are not selected by the UE.

For example, four-bit or eight-bit CRS may be applied to CRC for ACK/NACK and $x^4+x+1$ may be used as an example of a polynomial for the 4-bit CRS.

UL Approval DCI-Based CC Group Setting

A detailed embodiment of the present invention proposes a method in which an eNB sets a set S with $2^B$ elements each including CC groups previously or via a high layer signal to a UE and sets a CC group in which UCI piggyback in a PUSCH is to be performed through a bit field including B bits in dynamic control information (DCI) for UL approval in the S when the eNB sets $N_{CC}$ CCs to the UE. In this case, the eNB may assume ACK/NACK for non-selected CCs as NACK/DTX.

In terms of management of an eNB, a specific CC may have higher importance than other CCs. For example, it is assumed that CC group 1 includes CCs operating in a licensed band but CC group 2 includes CCs operating in an unlicensed band. In this case, when UCI for CC group 1 and UCI for CC group 2 may be transmitted in one PUSCH, if some of the UCI is excluded from transmission due to resource restriction, the eNB may prefer the UCI for CC group 1. Accordingly, the present invention proposes a method of directly indicating a CC group in which UCI piggyback is to be performed in a PUSCH corresponding DCI by an eNB by presetting a set including CC groups to a UE by an eNB and indicating a specific CC group in the set in DCI indicating UL approval in order to consider preference for the above management of the eNB.

CC Group Setting Based on Cyclic Shift (CS) and Orthogonal Cover Code (OCC) Combination of Demodulation Reference Signal (DM-RS)

A detailed embodiment of the present invention proposes a method in which, when an eNB sets $N_{CC}$ CCs to a UE, the eNB defines CC groups for each combination of CS and OCC for PUSCH DM-RS previously or via a high layer signal to the UE and the UE transmits UCI for a CC group selected according to a combination of the CS and OCC that set to the UE to a PUSCH via piggyback.

When the eNB notifies the UE of a CC group via UL approval DCI according to the aforementioned "UL approval DCI-based CC group setting", if a separate bit field is added to the DCI, control signaling overhead may be increased. In order to reduce the overhead, information on a CC group may be combined with information that is previously used by the UE. The present invention proposes one method in which an eNB previously sets a CC group for each combination of OCC and CS of a DM-RS that is used by a UE during PUSCH transmission and the UE selects a CC group that is to be UCI-piggybacked in a corresponding PUSCH according to a combination of the CS and the OCC. In this case, in an LTE system according to an exemplary embodiment of the present invention, a combination of the CS and the OCC may be indicated by a 3-bit cyclic shift field in DCI for UL approval, as shown in the following table. In this case, the OCC may be applied to the case in which an eNB sets Activate-DMRS with OCC as a high layer signal to a UE.

| Cyclic Shift Field in Uplink PDCCH grant | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

According to the step proposed according to the present invention, the eNB may set a CC group for each of states that are indicated by respective cyclic shift fields to the UE by the eNB.

Multiple PUSCH Transmission

Hereinafter, the present invention proposes a method of distributing UCI to a plurality of PUSCHs when a UE performs transmission of $N_{PUSCH}$ PUSCHs on different CCs and UCI of $N_{CC}$ CCs is present.

Maximum CC Number-Based Allocation for Permitting UCI Transmission for Each PUSCH A detailed exemplary embodiment of the present invention proposes a method in which, when a UE transmits UCI of a plurality of CCs through a plurality of PUSCHs, priority of $N_{PUSCH}$ PUSCHs is present and, when priority of $N_{CC}$ CCs is present, the eNB defines a maximum payload size or coding rate of specific UCI (e.g., ACK/NACK RI, and CQI/PMI) that can be transmitted in a k-th PUSCH and the UE selects a maximum number of CCs according to priority of the CCs so as not to exceed a maximum payload size in an order from a PUSCH with high priority and transmits the specific UCI for corresponding CCs.

Figure 12:
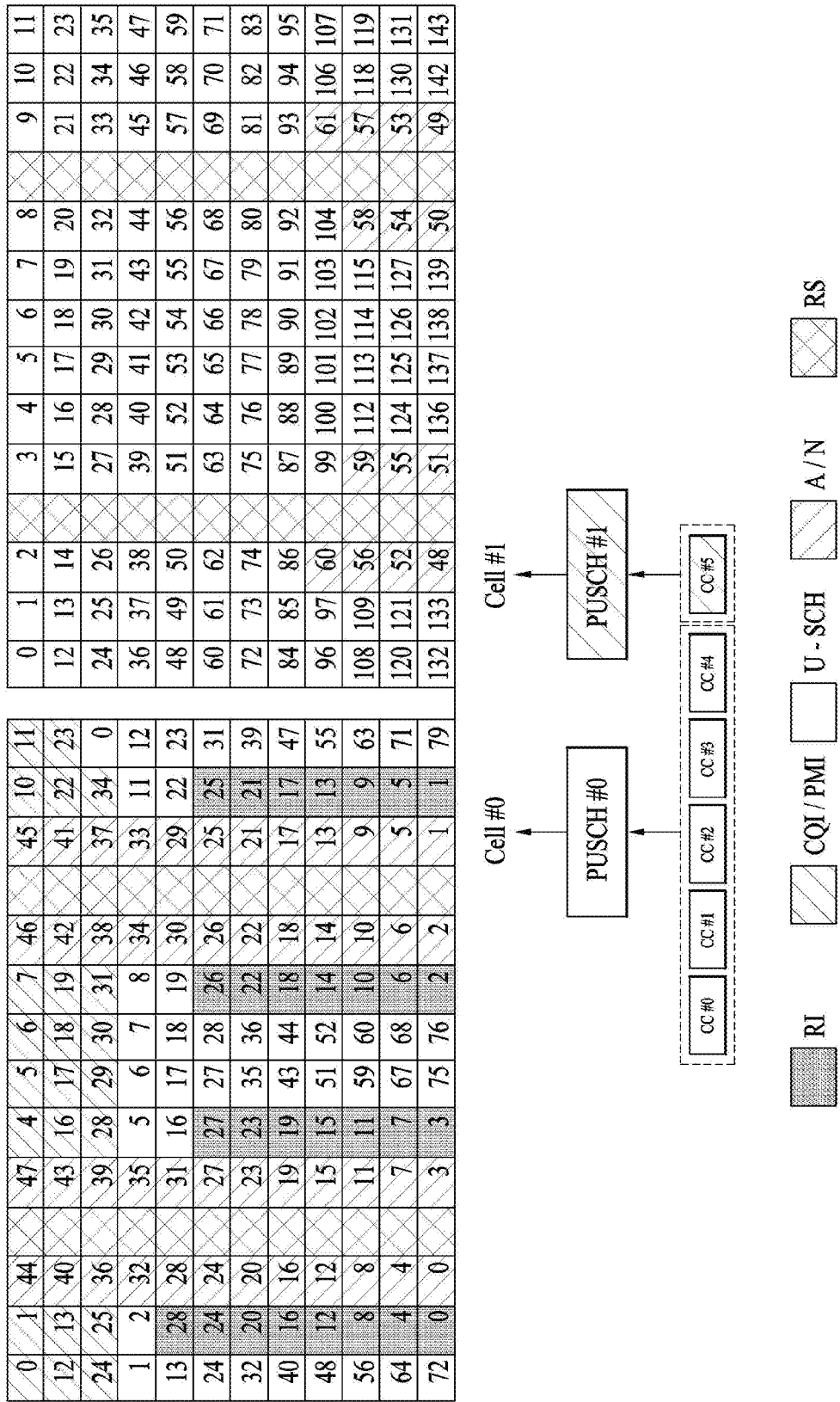
FIG. 12 illustrates an example of resource mapping of UCI for each physical uplink shared control channel (PUSCH) resource according to an exemplary embodiment of the present invention.

FIG. 12 proposes a method of transmitting UCI for a maximum of five CCs according to a maximum payload size of a PUSCH resource in the PUSCH resource with first priority and transmitting UCI of the remaining one CC permitted in a maximum payload size of a PUSCH resource in the PUSCH resource with second priority when two PUSCH resources are present and UCI for six CCs needs to be transmitted. In this case, exclusion of UCI allocated in a first PUSCH resource in a payload of entire UCI during a procedure of calculating a coded symbol for UCI in a second PUSCH resource needs to be considered.

CC Group-Based Allocation for Permitting UCI Transmission for Each PUSCH

A detailed embodiment of the present invention proposes a method in which a UE transmits UCI for a CC group set/determined for each PUSCH resource via piggyback according to the number of PUSCH resources allocated to the UE and the configuration/rule when the UE transmits UCI of a plurality of CCs through a plurality of PUSCHs and a CC group to be set (to a target on which UCI piggyback is to be performed) in each PUSCH resource according to the number of PUSCH resources is set from the eNB or is determined according to a specific rule.

According to the step of the "Maximum CC number-based Allocation for Permitting UCI Transmission for Each PUSCH", a PUSCH resource with high priority may use a UCI transmission resource to a maximum degree and a PUSCH resource with low priority may use a UCI transmission resource to a relatively low degree. In this case, the stability of UCI transmission for each PUSCH resource may be irregular and UCI may be regularly set for each PUSCH resource in terms of the stability of UCI transmission. As a method for highest uniformity, all UCI items of all CCs set to a UE may be considered as one container of a plurality of PUSCH resources and a coded symbol of UCI may be allocated while an index of a PUSCH resource is increased. However, the above method is vulnerable to a situation in which ambiguity such as PUSCH resource missing occurs and, accordingly, the present invention considers a method of setting a CC group for piggybacking UCI for each PUSCH resource according to the number of PUSCH resources as an alternative method.

For example, when all six CCs (e.g., CC #0, CC #1, CC #2, CC #3, CC #4, and CC #5) are present, an eNB may set a UCI piggyback target CC group for each PUSCH according to the number of PUSCH resources to a UE as shown in the following table.

TABLE 9

| PUSCH CC Group Number for PUSCH #0 | | CC Group for PUSCH #1 | CC Group for PUSCH #2 |
| --- | --- | --- | --- |
| 1 | CC #0, CC #1, CC #2, CC #3, CC #4, CC #5 | N/A | N/A |
| 2 | CC #0, CC #1, CC #2 | CC #3, CC #4, CC #5 | N/A |
| 3 | CC #0, CC #1 | CC #2, CC #3 | CC #4, CC #5 |

Integration UCI Transmission of a Plurality of CCs

A detailed embodiment of the present invention proposes a method of forming UCI via concatenation of UCI of a plurality of CCs and mapping a coded symbol generated by performing a channel coding procedure on the integration UCI to a plurality of PUSCH resources when a UE transmits UCI of a plurality of CCs through a plurality of PUSCHs.

Hereinafter, a detailed mapping method for each UCI is proposed.

(a) Time-First Mapping of Subframe Unit for a Plurality of PUSCH Resources

Figure 13:
FIG. 13 illustrates an example of resource mapping of UCI according to an exemplary embodiment of the present invention.

As one method for CQI/PMI mapping, mapping may be performed on all PUSCH resources according to priority of PUSCH resources using a time-first method. However, in this case, a mapping method needs to be repeatedly performed in each existing subframe unit in terms of hardware configuration and, the present invention proposes a method of time-first mapping in a subframe unit. FIG. 13 illustrates an example of the step.

As another method, a payload for the integration UCI may be divided into a plurality of segments and each segment may be transmitted in a separate PUSCH resource. In FIG. 13, a configuration in which CSI (e.g., RI and CQI/PMI) is piggybacked through only a single PUSCH resource with highest priority may be maintained, which is the same as in the prior art. In addition, ACK/NACK may be mapped from a PUSCH resource (e.g., up to N symbols) with highest priority and, then, mapped to a PUSCH with next highest priority (e.g., the same method as in FIG. 12).

Method of Determining Number of Coded Symbols for Each PUSCH with Different Transmission Resources Method of Extending Resource for UCI Transmission A detailed embodiment of the present invention proposes the following method. When a UE transmits UCI for a plurality of CCs through a plurality of PUSCHs, even if the plurality of PUSCH resources (a maximum number of RE resources to be provided therethrough) is used, if the aforementioned method of extending UCI resource in a PUSCH needs to be additionally applied (e.g., when a PUSCH resource with a small RB number is configured, if a total UCI payload size $P_0$ for the plurality of CCs is greater than a maximum UCI payload size $P_1$ that can be transmitted in the plurality of PUSCH resources), (i) Modulation Order for PUSCH Resources (or for UCI)
(ii) PUSCH Resource Amount
(iii) Maximum Coded bit (transport block size (TBS) or modulation and coding scheme (MCS) level) that can be transmitted in PUSCH resource a metric configured with one or a combination of (i), (ii), and (iii) may be defined and a UCI transmission resource extending method may be preferentially applied from a PUSCH resource with a high corresponding metric value. In this case, when $P_1 \geq P_0$ is not satisfied after resources of the plurality of PUSCH resources are extended, UCI for some CCs with low priority may be omitted.

Even if a UE is capable of transmitting UCI of a plurality of CCs with respect to a plurality of PUSCH resources via piggyback, the number of the CCs is sufficiently great and a UCI payload size is large, a resource region for UCI transmission needs to be extended with respect to some PUSCH resources. In this case, it may be efficient to extend a resource for transmission of UCI in a PUSCH with many allocated resources and a high modulation order applied to UCI transmission. Accordingly, the present invention proposes a method of extending a resource region for UCI transmission in a PUSCH in an order from a high modulation order or a high number of frequency resources for transmission of UCI in a PUSCH resource when a UE needs to perform UCI piggyback on a plurality of PUSCH resources and to extend a resource region for transmission of UCI in a PUSCH resource. For example, when $Q_m$ is a modulation order for UCI transmission, $M_{sc}$ is a resource amount (e.g., subcarrier number) of a frequency axis of a PUSCH, the present invention proposes a method of extending a UCI resource in a PUSCH resource in an order from high $S=Q_m M_{sc}$.

Method of Determining Coded Symbol (Number) for Each PUSCH after Determination of UCI Payload Size for Each PUSCH A detailed embodiment of the present invention proposes the following method. When a UE transmits UCI of a plurality of CCs through a plurality of PUSCHs, (i) Modulation order of PUSCH resource (or UCI)

(ii) Resource amount allocated for transmission of UCI in PUSCH resource (iii) Transmission maximum coded bit for UCI in PUSCH resource a metric configured with one or a combination of (i), (ii), and (iii) may be defined and a UCI transmission RE number, a UCI coded bit number, or a UCI coded symbol number for each PUSCH may be determined in proportion to the metric value. For example, a higher number of UCI transmission REs, UCI coded bits, or UCI coded symbols may be allocated to a PUSCH with a great metric value (than a PUSCH with a small metric value). In addition, when UCI is divided into partial sets (e.g., CC group) and the partial sets are respectively transmitted to a plurality of PUSCHs, each UCI partial set may also be configured based on (in proportion to) the metric.

An example of this case proposes a method in which a UCI payload size for each PUSCH is divided and a coded symbol number (or coded bit number) for each PUSCH is determined according to the UCI payload size for each PUSCH.

When the UE transmits UCI with UCI for a plurality of CCs or a large payload size to a plurality of PUSCH resources via UCI piggyback, a large amount of UCI as possible may be piggybacked to a PUSCH resource for transmitting a large amount of coded bits due to a high modulation order or a large amount of PUSCH resources. Accordingly, the present invention proposes a method of defining a metric value for each PUSCH using a combination of a modulation order of UCI in a PUSCH resource, a resource amount allocated for transmission of UCI in a PUSCH resource, and a transmission maximum coded bit for UCI in a PUSCH resource and dividing a UCI payload size for a plurality of CCs in proportion to the metric value.

Hereinafter, a method of selecting a CC set for transmitting UCI in each PUSCH resource in proportion to a metric value for each PUSCH as an example of the above step will be described.

(a) Method of Dividing UCI Payload in CC Unit

When a total of N CCs are present and a UCI payload size for an n-th CC is $B_{UCI,n}$ bit and a metric for a k-th PUSCH resource of a total of K PUSCH resources is given by $M_k$, a UCI payload size proportional to a metric value in each k-th PUSCH resource may be determined according to the following equation.

$$U_k = \min\left(U_{max,k}, \left\lceil B_{tot} \cdot \frac{M_k}{\sum_k M_k} \right\rceil\right) \quad \text{[Equation 6]}$$

where $B_{tot} = B_{UCI,0} + B_{UCI,1} + \ldots + B_{UCI,N-1}$

Here, $U_{max,k}$ refers to a maximum UCI payload size that can be transmitted in a k-th (e.g., k=0, 1, 2, 3, ... ) PUSCH resource. Then, the UE may determine the number of CCs for transmitting UCI in a k-th PUSCH resource and indexes (i.e., n(k), n(k)+1, ..., n(k)+$X_k$) according to the following equation.

$$X_k = \underset{S_x \leq U_k}{\operatorname{argmax}}(S_x) \quad \text{[Equation 7]}$$

where $S_x = B_{UCI,n(k)} + B_{UCI,n(k)+1} + \ldots + B_{UCI,n(k)+x}$ $n(k) = X_0 + X_1 + \ldots + X_{k-1}$ $X_{-1} = 0$ Here, $$\underset{(A)}{\operatorname{argmax}}(B)$$

refers to a value of x for making a maximum value in brackets (B) while satisfying a condition in brackets {A}. That is, when a predetermined order for PUSCH resources is present, UCI of CCs may be sequentially contained so as not to exceed $U_k$ for each PUSCH in the order. For example, when a ratio of $U_0$ and $U_1$ is 3:2 and UCI sizes for CCs are the same, $CC_0$, $CC_1$, and $CC_2$ may be contained in a 0-th PUSCH resource and UCI for $CC_3$ and $CC_4$ may be contained in a first PUSCH resource.

Then, the number of coded symbols for UCI transmission in each PUSCH resource may be determined according to a UCI payload size distributed for each PUSCH resource. For example, in the case of ACK/NACK, when each PUSCH resource transmits one transport block (TB) in an LTE system according to an exemplary embodiment of the present invention, the number of coded symbols for each PUSCH resource may be determined according to the following equation.

$$Q'_k = \min\left(\left\lceil \frac{O_k \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{[Equation 8]}$$

Here, $O_k$ is a UCI payload size distributed in a k-th PUSCH resource according to the above step of the present invention, $M_{sc}^{PUSCH}$ is a frequency axis subcarrier number of an allocated PUSCH resource, $N_{symb}^{PUSCH-initial}$ is an SC-FDMA symbol number allocated a PUSCH resource, Kr is a bit number transmitted in an r-th code block, $\beta_{offset}^{PUSCH}$ is a design parameter, and $\lceil \ \rceil$ is a ceiling symbol.

In more general, the number of coded symbols for UCI transmissions for each PUSCH resource may be represented according to the following equation.

$$Q'_k = \min\left(\left\lceil \beta_k \frac{O_k}{R_k}\right\rceil, Q_{max,k}\right) \quad \text{[Equation 9]}$$

where $R_k$=Transmittable number of bits in transport blocks per RE (for k-th PUSCH)

Here, $\beta_k$ is a design parameter applied to a k-th PUSCH resource and $Q_{max,k}$ is a maximum coded symbol number that can be allocated for UCI in a k-th PUSCH resource.

Method of Determining Coded Symbol and then Distributing Coded Symbol for Each PUSCH According to Total UCI Payload Sizes A detailed embodiment of the present invention proposes the following method. When a UE transmits UCI for a plurality of CCs through a plurality of PUSCHs, (i) Modulation order of PUSCH resource (or UCI)

(ii) Resource amount allocated for UCI transmission in PUSCH resource (iii) Maximum coded bit that can be transmitted for UCI in PUSCH resource a metric configured with one or a combination of (i), (ii), and (iii) may be defined, a ratio of a coded symbol number for each PUSCH may be determined in proportion to the metric value, and UCI of a plurality of CCs is integrated in consideration of the ratio of the coded symbol and the coded bit number that can be transmitted for each RE to obtain a coded symbol number under assumption of single UCI. In this case, the coded symbol number for each PUSCH may be obtained by applying the ratio of the coded symbol for each PUSCH to the number of all coded symbols.

In addition, the present invention proposes a method of obtaining a ratio (integer ratio) of symbol number coded for each PUSCH in proportion to the metric value, determining a coded symbol number for a PUSCH with a ratio of a lowest coded symbol number in consideration of the ratio of the coded symbol number, the coded bit number that can be transmitted for each RE, and the total UCI payload size for all CCs, and obtaining the coded symbol number for the remaining PUSCHs by applying the ratio.

In detail, when the UCI payload size of the all CCs are given by $O_{tot}$, a coded symbol number for a PUSCH with a minimum metric may be determined according to the following equation.

$$Q'_k = \min\left(\left\lceil \beta \frac{O_{tot}}{\frac{\gamma_0}{\gamma_{min}}R_0 + \frac{\gamma_1}{\gamma_{min}}R_1 + \ldots + \frac{\gamma_{K-1}}{\gamma_{min}}R_{K-1}}\right\rceil, Q_{max}\right) \quad \text{[Equation 10]}$$

where $R_k$=Transmittable number of bits in transport blocks per RE (for k-th PUSCH)

$\gamma_k \in \{1, 2, 3, \ldots\}$ $\gamma_{min} = \min\{\gamma_0, \gamma_1, \gamma_2, \ldots, \gamma_{K-1}\}$ Here, $\beta$ is a design parameter, $Q_{max}$ is a maximum coded symbol number that can be allocated for UCI in a PUSCH resource with a minimum metric, and $\gamma_k$ is a ratio of a coded symbol for each PUSCH. For example, when $\beta=1$, total UCI payload size $O_{tot}=100$ bits, 1 bit (i.e., $R_0=1$) for each RE is transmitted in a 0-th PUSCH resource, 0.5 bit (i.e., $R_1=0.5$) for each RE is transmitted in a first PUSCH resource, and a ratio of the numbers of coded symbols of a 0-th PUSCH and a first PUSCH is 1:2, the number of coded symbols for the 0-th PUSCH may be determined as 50 and the number of coded symbols for the first PUSCH may be determined as 100. Accordingly, 50 bits may be transmitted to 50 REs in the 0-th PUSCH and 50 bits may be determined to 100 REs in the first PUSCH.

Step of UE when a Plurality of DAIs According to a Plurality of PUSCHs are Present A detailed embodiment of the present invention proposes the following step. When a UE integrates UCI of a plurality of CCs through a plurality of PUSCHs and performs piggyback and there are a plurality of downlink assignment index (DAI) values $V_1, V_2, \ldots, V_{N\_PUSCH}$ (which are signaled from UL approval for scheduling a plurality of corresponding PUSCHs) corresponding to $N_{PUSCH}$ PUSCHs (which are selected for UCI piggyback), the UE assumes V' as a DAI value for entire UCI (i) V'=DAI of PUSCH for lowest UL CC index (ii) V'=max($V_1, V_2, \ldots, V_{N\_PUSCH}$)

(iii) V'=min($V_1, V_2, \ldots, V_{N\_PUSCH}$)

as one of (i), (ii), and (iii).

When there is a PUSCH (e.g., PUSCH transmitted in the form of SPS or PUSCH in which PHICH-based non-adaptive retransmission is performed) without corresponding DAI among PUSCHs selected for UCI piggyback, there the corresponding PUSCH may be excluded from the procedure for determining the above V' value.

When an LTE system according to an exemplary embodiment of the present invention operates as a TDD-based system, a UE may receive an accumulative number of DL subframes as a target of ACK/NACK transmission through DCI (e.g., UL approval) indicating PUSCH transmission, i.e., a DAI value. In this case, the UE has a plurality of DAI values corresponding to a plurality of PUSCHs and a rule for applying a DAI value when a payload size of UCI is determined needs to be predefined. Accordingly, the present invention proposes a method of determining a single DAI value for a plurality of CCs as (i) a DAI of a PUSCH resource with a lowest index of UL CC, (ii) a maximum value of all DAI values, or (iii) a minimum value of the values, as described above.

When sets (e.g., CG) of CCs as a UCI transmission target for each PUSCH resource is pre-separated and set, a DAI value for CCs for each CG may be a DAI value indicating transmission of a PUSCH resource in which UCI of a corresponding CG is piggybacked.

CSI Mapping Order

A detailed embodiment of the present invention proposes a method of determining an order for allocating CSI according to one or a combination of a plurality of elements among the following elements when a UE transmits a plurality of periodic CSIs to a PUSCH resource via piggyback.

(i) CSI report type of corresponding CSI (i.e., RI, CQI, and PMI)

(ii) Cell index to which corresponding CSI is applied (iii) CG index to which corresponding CSI is applied (iv) Payload size of corresponding CSI (v) Transmission mode (TM) related to corresponding CSI Here, the CSI mapping order refers to an order for allocating a coded symbol to a PUSCH resource.

As an example according to the present embodiment, when two CSIs (e.g., $CSI_1$ and $CSI_2$) are considered, a CSI mapping order that complies with the following two options may be considered.

Option 1: When CSI with high priority between CSI report types is present, the corresponding CSI is first mapped and when CSI report types between two CSIs have the same priority, CSI with a preceding cell index is first mapped.

Option 2: When CSI with a preceding cell index is present, the corresponding CSI is first mapped and when the two CSIs have the same cell index, CSI with high priority of CSI report type is first mapped.

Here, for example, priority of the CSI report type may be set according to RI>CQI=PMI.

The present invention proposes a method of setting a CSI mapping order of an aperiodic CSI to always precede a periodic CSI when a UE transmits the aperiodic CSI and the periodic CSI to a single or a plurality of PUSCH resources via piggyback, as an additional step.

In addition, (assuming that a plurality of aperiodic CSIs are separately coded), in the case of each aperiodic CSI, an order for allocating CSI may be determined according to one or a combination of a plurality of elements among the following elements similarly to the periodic CSI.

Beta Offset Setting Method According to UCI Payload Size

A detailed embodiment of the present invention proposes a method of independently setting a beta value according to a UCI payload size or the number of CCs set to a UE, to the UE when the UE transmits UCI to a PUSCH resource via piggyback and an eNB applies a design parameter beta set as a high layer signal to calculate a coded symbol number for transmission of UCI in the PUSCH.

For example, when beta values are differently set according to a UCI payload size, the eNB may notify the UE of independent beta values (e.g., $\beta_0$ and $\beta_1$) according to a UCI payload size via a high layer signal such as RRC as shown in the following table. Accordingly, in a specific CA situation, the UE may apply different beta values according to a UCI payload size (UCI transmission RE is determined according to the result and UCI is mapped in the corresponding RE) to perform UCI transmission via piggyback to a PUSCH and, specifically, the aforementioned method of setting and applying independent/different beta values according to the UCI payload size may be applied only to the case of HARQ-ACK and/or RI feedback.

TABLE 10

| UCI Payload size, O [bits] | Beta |
|---|---|
| 0 < O ≤ 20 | $\beta_0$ |
| 20 < O ≤ 64 | $\beta_1$ |

When a UCI payload size is small, the above step affords to further transmit a coded symbol for UCI transmission in a PUSCH resource but, when a coded symbol for UCI transmission needs to be minimized due to a large UCI payload size via massive CA scheme or the like, the step may be usefully applied.

HARQ-ACK Rate Matching

According to a detailed embodiment of the present invention, when a UE transmits UCI to a PUSCH resource via piggyback, an eNB may perform the following step to the UE.

(i) the eNB may semi-statically set an indicator indicating whether HARQ-ACK rate matching is performed via high layer signaling such as RRC, or (ii) the eNB may dynamically indicate the indicator via dynamic control signaling such as DCI.

In this case, when the indicator indicates that HARQ-ACK rate matching is performed, (i) If a UL DAI value is present in UL approval of the eNB and a value indicated by the corresponding UL DAI contains only the case in which the number of DL subframes as a HARQ-ACK report target is one or more, the UE may perform rate matching on REs to which coded symbols of HARQ-ACK are allocated. That is, UCI other than data or HARQ-ACK may be allocated on a resource region obtained by excluding REs allocated for the HARQ-ACK.

(ii) If a UL DAI value is not present in UL approval of the eNB and a value indicated by the corresponding UL DAI contains the case in which the number of DL subframes as a HARQ-ACK report target is 0 (or when a value of UL DAI is 4), the UE may perform puncturing on REs to which coded symbols of HARQ-ACK are allocated like in the prior art. That is, UCI other than data or HARQ-ACK may be allocated on a resource region including REs allocated for the HARQ-ACK.

In this case, locations of REs allocated coded symbols for HARQ-ACK may be the same irrespective of whether rate matching or puncturing is performed.

As the step of the present invention, when a resource region for HARQ-ACK transmission in a PUSCH resource is extended, according to the legacy LTE system method, transmission reliability of data or CQI/PMI may be lowered while data, other UCI (e.g., CQI/PMI), or the like that is pre-allocated to REs to which a coded symbol of HARQ-ACK is allocated is punctured. Accordingly, the present invention proposes a method in which a UE performs HARQ-ACK rate matching according to the indicator transmitted by an eNB.

Figures 14, 15:
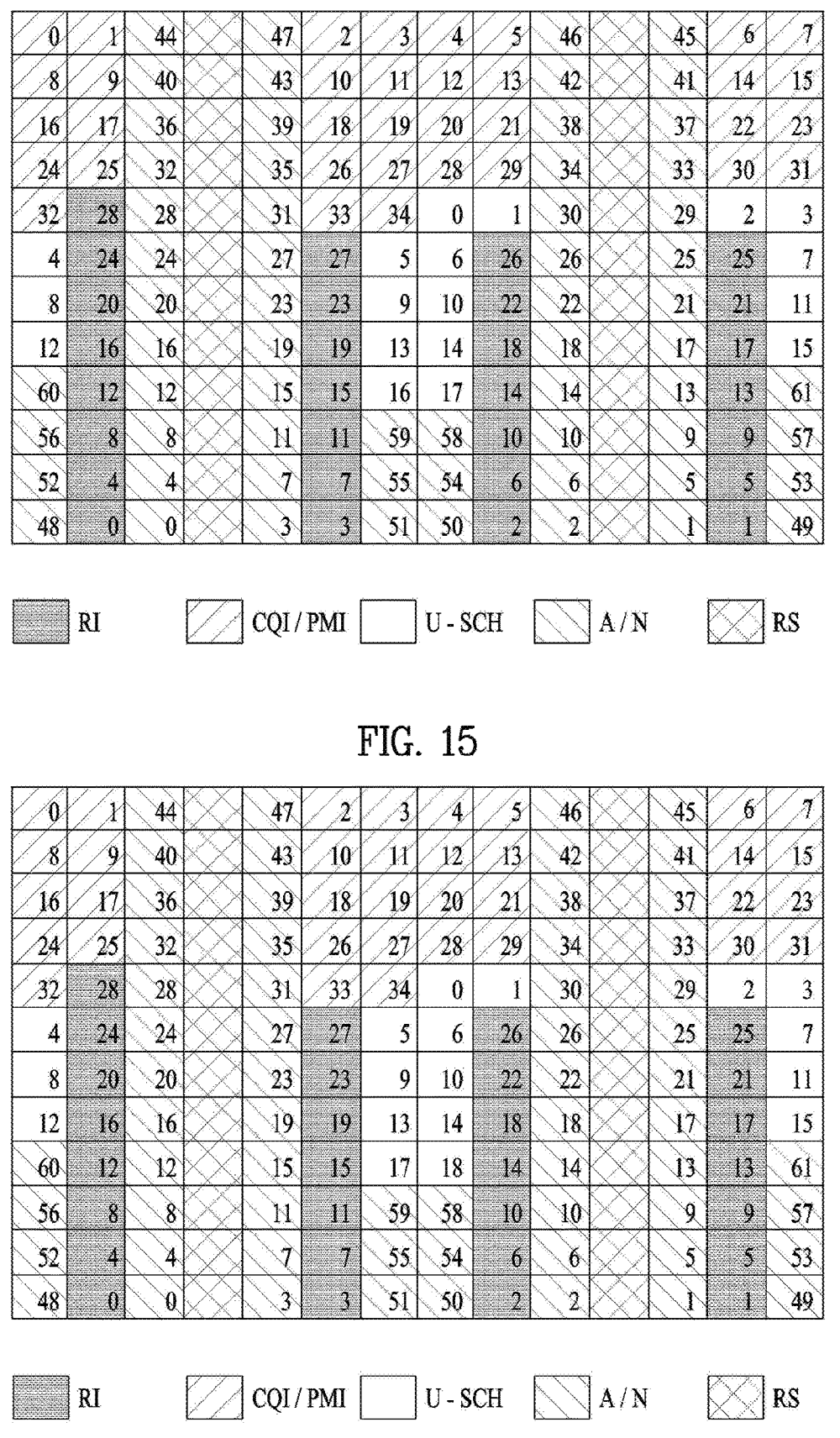

FIG. 14 illustrates a method of allocating a coded symbol of data and CQI/PMI by applying rate matching to a HARQ-ACK resource when a HARQ-ACK transmission resource is extended in the form of FIG. 9. Here, FIG. 14 is different from FIG. 9 in that channel coding and mapping of CQI/PMI and data are performed in consideration of REs allocated a coded symbol of HARQ-ACK.

As an additional step according to the present invention, when the UE transmits UCI to a PUSCH resource via piggyback, an eNB may perform the following step to the UE.

(i) the eNB may semi-statically set an indicator indicating whether HARQ-ACK rate matching is performed via high layer signaling such as RRC, or (ii) the eNB may dynamically indicate the indicator via dynamic control signaling such as DCI.

In addition, when the indicator indicates that HARQ-ACK rate matching is performed, (i) The UE performs rate matching on REs in a specific resource region that is previously semi-statically set by the eNB.

(ii) When a size of a resource region calculated for allocation of a coded symbol of HARQ-ACK by the UE is greater than a specific resource region that is previously semi-statically set by the eNB, the UE may perform rate matching on REs in the specific resource region.

In this case, the specific resource regions may be contained in a maximum resource region to which a coded symbol of HARQ-ACK is allocated and, for example, may be set in a SC-OFDM symbol unit.

For example, as illustrated in the example of FIG. 9, when a HARQ-ACK resource is extended, the eNB may make the UE perform rate matching only on SC-OFDM symbols adjacent to a DM-RS.

As described above, when a resource region as a rate matching target is preset for allocation of an HARQ-ACK resource, the complexity of a UE may be advantageously alleviated. FIG. 15 is different from FIG. 14 in that it is not necessary to consider rate matching of $60^{th}$ and $61^{st}$ REs for HARQ-ACK during a procedure of mapping data.

UCI Piggyback Via Single PUSCH Over a Plurality of CGs

A detailed embodiment of the present invention proposes a method of containing a UL DAI field in UL DCI format (or UL approval) indicating transmission of the PUSCH resource as described below when there are a plurality of CGs including one or more CCs and when the UE piggybacks UCI for CCs belonging to different CGs to a single PUSCH resource (hereinafter, for convenience, referred to as "UCI on PUSCH over CG"). In this case, the CG includes at least one PUCCH cell and the PUCCH cell refers to a cell in which PUCCH resource-based UCI can be transmitted in UCI transmission for a corresponding CG.

(i) Case 1: When at least one PUCCH cell among all cells (or CCs) is TDD (UL-DL configuration is not 0), UL DAI may be signaled through UL DCI format of all cells (or CCs) except for a PCell (or PUCCH cell) (which includes a UL DAI field therefor).

(ii) Case 2: When all PUCCH cells included in all cells (or CCs) are FDD (or TDD UL-DL configuration is 0), UL DAI may not be signal through UL DCI format of cells in all CGs except for a PCell (or PUCCH cell) (which does not include a UL DAI field therefor).

(iii) In the case of the excluded PCell (or PUCCH cell), whether UL DAI is signaled (and whether a UL DAI field therefor is contained) may be determined through UL DCI format according to whether the corresponding cell is TDD (UL-DL configuration is not 0).

Here, UL DCI format of a specific cell includes the meaning of UL approval as DCI indicating PUSCH scheduling of a corresponding cell.

In the LTE system according to an exemplary embodiment of the present invention, a UL DAI field may be contained in DCI format 0 indicating UL transmission according to conditions stated in the following reference.

[Reference 1]

Downlink Assignment Index (DAI)—2 bits (this field is present only for cases with TDD primary cell and either TDD step with uplink-downlink configurations 1-6 or FDD step)

That is, in an existing LTE system, when a single cell performs a TDD step or a primary cell performs a TDD step in a CA situation of a FDD cell and a TDD cell, a UL DAI field is applied to all cells in a corresponding CA. Similarly, in a dual connectivity (DC) environment, whether the UL DAI is present may be determined according to a TDD step of a PCell or a PScell is performed for each CG. That is, when a PCell (or PScell) in a specific CG operates as TDD, the UL DAI field may be contained in UL DCI format of all CCs included in the corresponding CG. However, a method of setting a PUCCH cell in which a plurality of CCs are separated into CG units and a PUCCH resource in each CG is transmitted due to an increased load amount of UCI transmission while considering a massive CA scheme in a Rel-13 LTE system has been discussed. In this case, a plurality of CCs are separated in CG units but, in reality, the CCs are CCs managed by a single eNB and, thus, it may not be necessary to separate the CCs in a CG unit like in existing DL during UCI piggyback to a PUSCH resource. Accordingly, UCI of CCs belonging to different CGs may be piggybacked to one PUSCH resource. In this case, DL HARQ reference timing of each CC is based on a PUCCH cell present in a CG to which the CC belongs and, thus, the timing may be varied according to the CG to which the corresponding CC belongs. Accordingly, when a PUCCH cell as at least one of TDD of all cells (or CC) is present, UL DAI signaling (and UL DAI fields are contained) may be performed on UL DCI format of an arbitrary CC in the all CCs.

When TDD cells to which a CA scheme of a Rel-12 LTE system is applied have different UL/DL configurations, the UE may correspond UL DAI (e.g., $W_{DAI}^{UL}$) to the number of DL subframes (e.g., $B_c^{DL}$) considered to calculate UCI payload, as shown in the following reference.

[Reference 2]

If DL-reference UL/DL configuration of each of the configured serving cells belongs to $\{0, 1, 2, 3, 4, 6\}$ and for a PUSCH transmission in a subframe n adjusted based on a detected PDCCH/EPDCCH with DCI format 0/4 using UL-reference UL/DL configuration belonging to $\{1, 2, 3, 4, 5, 6\}$, the UE shall assume $B_c^{DL}=\min(W_{DAI}^{UL}, M_c)$ The UE shall not transmit HARQ-ACK on PUSCH if the UE does not receive PDSCH or PDCCH/EPDCCH indicating downlink SPS release in subframe(s) n-k where k∈K and $W_{DAI}^{UL}=4$.

If DL-reference UL/DL configuration of at least one configured serving cell belongs to $\{5\}$ and for a PUSCH transmission adjusted based on an associated detected PDCCH/EPDCCH with DCI format 0/4 using UL-reference UL/DL configuration belonging to $\{1, 2, 3, 4, 5, 6\}$, the UE shall assume $B_c^{DL}=\min(W_{DAI}^{UL}+4|(U-W_{DAI}^{UL})/4|, M_c)$, where U denotes the maximum value of $U_c$ among all the configured serving cells, $U_c$ is the total number of received PDSCHs and PDCCH/EPDCCH indicating downlink SPS release in subframe(s) n-k for the c-th serving cell, k∈K. The UE shall not transmit HARQ-ACK on PUSCH if the UE does not receive PDSCH or PDCCH/EPDCCH indicating downlink SPS release in subframe(s) n-k where k∈K and $W_{DAI}^{UL}=4$.

In this case, the "serving cells" considered in the above reference refer to cells configured to be included in MCG and SCG that are defined for a step in a DC environment as shown in the following reference.

[Reference 3]

If the UE is configured with a SCG, the UE shall apply the procedures described in this subclause for both MCG (master cell group) and SCG (secondary cell group).

When the procedures are applied for MCG, the term "serving cell" in this subclause refers to serving cell belonging to the MCG.

When the procedures are applied for SCG, the term "serving cell" in this subclause refers to serving cell belonging to the SCG. The term "primary cell" in this subclause refers to the PSCell of the SCG.

Accordingly, according to the present invention, when UCI piggyback is performed on a PUSCH resource of other CGs other than a corresponding CG using UCI of a specific CG, it may also be necessary to change the step of the UE of Reference 2 above. According to the present invention, the two methods are broadly considered.

(i) When an eNB transmits UL DAI signaling and a UE interprets the number of DL subframes (e.g., $B_c^{DL}$) in order to calculate a UCI payload through the UL DAI value, the number of DL subframes (e.g., $B_c^{DL}$) for calculation of UCI payload may be calculated using at least one or a combination of the following elements with respect to cells in CGs on which "UCI on PUSCH over CG" is performed between the CGs.

A. UL DAI Value

B. Total Number of received PDSCH of each cell and PDCCH/EPDCCH indicating SPS release C. DL reference (or UL reference) UL/DL configuration of each cell i. the number of DL subframes (e.g., $M_c$) derived from corresponding UL/DL configuration (ii) CG (or PUCCH cell group) in which the "UCI on PUSCH over CG" step is performed is defined as a low group of MCG or SCG of Reference 3 above.

As an additional step according to the present invention, when the step "UCI on PUSCH over CG" is performed on one or more CGs, the UE may perform a UCI transmission step in which a UL DAI value is applied when the number of DL subframes (e.g., $B_c^{DL}$) for calculation of UCI payload of cells belonging to a CG on which PUSCH transmission is performed, the number of DL subframes for calculation of UCI payload of cells belonging to a CG on which PUSCH transmission is not performed is not derived from the UL DAI value, a maximum UCI payload size (the number of maximum DL subframes and the total number of cells included in the corresponding CG) is assumed when ACK/NACK for corresponding CG is present, and a corresponding UCI payload is not configured when ACK/NACK for corresponding CG is not present.

The above step may not be limited to the case in which a PUCCH cell (UL-DL configuration is not 0) of CG in which a PUSCH is transmitted is TDD and when the PUCCH of the CG in which the PUSCH is transmitted is FDD, UL DAI corresponding to the corresponding PUSCH may be applied to determine a UCI payload size of all CGs. In addition, when the PUCCH cell of the CG in which the PUSCH is transmitted is FDD, the UCI payload size of the corresponding CG may be determined as a maximum cell number that is set without application of UL DAI.

UCI Piggyback According to the Number of PUSCH Resources

As an additional step according to the present invention, when there are a plurality of PUSCH resources to be transmitted, a UCI piggyback target CG may be set for each PUSCH resource and transmitted to one PUSCH resource corresponding to UCI of one CG via piggyback and when there is a single PUSCH resource to be transmitted, UCI of a plurality of CGs may apply separate coding/mapping for each CG and UCI may be transmitted to one PUSCH resource via piggyback.

PUSCH Drop Method

A.1 PUSCH Drop Condition

The present invention proposes a step as an additional step of dropping a PUSCH transmission resource and performing UCI transmission according to at least one condition of a combination of a plurality of conditions among the following conditions when a UE does not support simultaneous transmission of a PUSCH and a PUCCH and performs UCI piggyback in a PUSCH resource. Hereinafter, UCI may be limited to HARQ-ACK.

[Condition List A.1]

(i) When a UCI payload is $K_0$ bits or more (ii) When an allocated PUSCH resource amount (i.e., PRB number or RE number) is equal to or less than $N_0$ (iii) When the number of CCs set to a UE is equal to or greater than $M_0$ (iv) When the number of CCs (e.g., the number of scheduled CCs) on which a UE performs UCI piggyback is equal to or greater than $L_0$ (v) When a coding rate for HARQ-ACK (or specific UCI) is equal to or greater than $C_0$ a. The coding rate may be calculated according to a procedure related to a coding rate for the aforementioned UCI resource extension.

(vi) when a coding rate of data in a PUSCH is equal to or greater than $C_1$ a. For example, a coding rate of data may be calculated according to (data payload size)/(modulation order×(total number of REs in PUSCH—the number of REs rate-matched and punctured for RS or UCI transmission)).

For example, in an LTE system according to an exemplary embodiment of the present invention, it is expected that an eNB makes a UE transmit a PUSCH1 and a PUSCH2 and performs UCI piggyback to the PUSCH1 but the UE may miss UL approval of PUSCH1 and perform UCI piggyback on the PUSCH2. In this case, since the eNB does not expects that the UE performs UCI piggyback on the PUSCH2, a sufficient PRB may not be allocated to the PUSCH2 and, thus, a source amount may be insufficient to perform UCI piggyback. In the above case, when a PUSCH resource is excessively insufficient to transmit UCI piggyback, PUSCH transmission may be dropped and UCI information such as HARQ-ACK or CSI may be transmitted to a PUCCH resource. For example, when a reference value of the number of CCs in which UCI piggyback can be performed may be preset to correspond to the number of PRBs allocated to a PUSCH resource and the number of CCs set for UCI piggyback with respect to a specific PRB number or the number of scheduled CCs is greater than the reference value of the number of CCs in which the UCI piggyback can be performed, PUSCH resource transmission may be dropped and UCI may be transmitted to a PUCCH.

In more general, when there are one or more PUSCHs to be transmitted to a UE that does not support simultaneous transmission of a PUSCH and a PUCCH (or in which corresponding simultaneous transmission is not set), whether one (or a plurality of conditions) among the conditions proposed according to A.1 above for each PUSCH may be checked and when there is at least one PUSCH that satisfies the above condition, the UE may perform UCI piggyback on a PUSCH with highest priority among corresponding PUSCH(s). When there is no PUSCH that satisfies the above condition, the UE may drop transmission of all PUSCHs and perform UCI transmission to a PUCCH.

A.2 Resource Allocation Method During UCI Transmission Through PUCCH after PUSCH Drop The present invention proposes a step as an additional step of setting the PUCCH using at least one of the following methods when a UE drops PUSCH transmission and performs UCI transmission using a PUCCH resource according to a rule determined between an eNB and the UE according to the step A.1 while the UE does not support simultaneous transmission of a PUSCH and a PUCCH and performs UCI piggyback to a PUSCH resource.

(i) A PUCCH resource indicated by ACK-NACK resource indicator (ARI) in DCI transmitted according to DL approval corresponding to HARQ-ACK transmission (ii) A PUCCH resource corresponding to a start CCE index of DCI transmitted according to DL approval corresponding to HARQ-ACK transmission (iii) An eNB allocates an obvious PUCCH resource via a high layer signal When PUSCH transmission is dropped and UCI is transmitted through a PUCCH resource according to the step A.1, a PUCCH resource corresponding to DL approval for triggering transmission of corresponding UCI (e.g., HARQ-ACK) may be used.

The present invention proposes a stepwise PUSCH piggyback method using the proposed methods as an additional step.

Hereinafter, C_th may refer to one or more of the conditions proposed in the [Condition List A.1] and A/N bundling may refer to application of at least one of spatial bundling for applying a logical AND operation to HARQ-ACK to a plurality of (different) TBs, CC domain bundling for applying a logical AND operation to HARQ-ACK to a plurality of (different) CCs, and time domain bundling for applying a logical AND operation to HARQ-ACK to a plurality of (different) SFs.

Hereinafter, according to priority between PUSCHs, cells in which aperiodic CSI report is transmitted may be higher than other cells, (when there is no cell in which aperiodic CSI report is transmitted) a PCell may be higher than an SCell, and priority may be set to be higher as a cell index in the SCell is lowered. The priority between PUSCHs may be defined in terms of C_th. When a condition defined as C_th refers to the case in which a specific metric is higher than a specific threshold value, priority of a PUSCH is increased as the metric is higher, and when a condition defined as C_th refers to the case in which a specific metric is lower than a specific threshold value, priority of a PUSCH is increased as the metric is lower. In this case, cells in which aperiodic CSI report is transmitted may also be higher than other cells, (when there is no cell in which aperiodic CSI report is transmitted), the above priority may be applied to the remaining cells.

1. PUSCH Piggyback Method 1

A. Step 1: Piggyback (non-bundled A/N) to a PUSCH with highest priority among PUSCHs that satisfy C_th based on non-bundled A/N.

B. Step 2: Piggyback (bundled A/N) to a PUSCH with highest priority among PUSCHs that satisfy C_th based on bundled A/N when there is no PUSCH that satisfies C_th based on non-bundled A/N.

C. Step 3: Drop all PUSCHs and transmit (non-bundled or bundled) A/N to a PUCCH when there is no PUSCH that satisfies C_th based on bundled A/N.

2. PUSCH Piggyback Method 2

A. Step 1: Piggyback (non-bundled A/N) to a corresponding PUSCH when a PUSCH with highest priority satisfies C_th based on non-bundled A/N.

B. Step 2: Piggyback (bundled A/N) to a corresponding PUSCH when a PUSCH with highest priority does not satisfies C_th based on non-bundled A/N but satisfies C_th based on bundled A/N.

C. Step 3: Perform Steps 1 and 2 on a PUSCH with next highest priority when a PUSCH with highest priority does not satisfy C_th based on bundled A/N and the corresponding PUSCH is dropped or not dropped.

D. Step 4: Drop all PUSCHs and transmit (non-bundled or bundled) A/N to a PUCCH when all PUSCHs do not satisfy C_th based on bundled A/N.

3. PUSCH Piggyback Method 3

A. Step 1: Piggyback (non-bundled A/N) to a corresponding PUSCH when a PUSCH with highest priority satisfies C_th based on non-bundled A/N.

B. Step 2: Piggyback (bundled A/N) to a corresponding PUSCH when a PUSCH with highest priority does not satisfies C_th based on non-bundled A/N but satisfies C_th based on bundled A/N.

C. Step 3: Drop all PUSCHs and transmit (non-bundled or bundled) A/N to a PUCCH when a PUSCH with highest priority does not satisfy C_th based on bundled A/N.

Extension PRB Allocating Method

B.1 Method of presetting an extended PRB resource including PRB allocated for PUSCH transmission to a UE by an eNB and using the extended PRB resource when PUSCH piggyback is performed UCI with respect to at least one of the following conditions during PUSCH piggyback of UCI to a PUSCH resource.

(1) When dynamic signaling (e.g., DCI) of an eNB is indicated (2) The case corresponding to one condition of the above condition list A.1

(3) When PRB number (e.g., PRB1) corresponding to the set number of CCs is defined and a PRB number (e.g., PRB2) of a PUSCH resource is lower than the PRB number corresponding to the set number of CCs. However, a PRB number of a PUSCH resource is extended to PRB1.

When an LTE Rel-12 system according to an exemplary embodiment of the present invention performs UCI piggyback in a PUSCH resource, a resource corresponding to a maximum four SC-FDMA symbols in an allocated PUSCH PRB region may be used for A/N transmission. However, when the massive CA scheme described in the section of Background Art is introduced, an A/N payload is relatively increased compared with a resource set to the four SC-FDMA symbols and a coding rate of A/N may be increased or some A/N payload may not be transmitted. In order to overcome the problem, a PRB region of a PUSCH resource is increased according to an A/N payload but resources may be inefficiently used such that a large amount of resource than a PRB number that is required for actual data transmission. Accordingly, as another method, when an A/N payload is great, additional PRB may be set to a PRB region for data transmission and A/N piggyback may be performed on the extended PRB region. A/N transmission may be performed only when other PUSCHs are not transmitted in an extended PRB region and, thus, the eNB may indicate whether A/N transmission is permitted with respect to the extended PRB region via dynamic signaling.

B.2 When a PUSCH resource is extended according to B.1, an extensible direction may be limited according to a location of the PUSCH resource and a UL transmission situation in an adjacent PRB region. For example, when a PUSCH resource is allocated to an uppermost region in a frequency axis, a PRB for UCI transmission may be extended only in a downward direction in a frequency axis. Accordingly, the present invention proposes a method of indicating one of [upward U(i) PRBs and downward L(i) PBRs], i=1, 2, . . . , 2N combinations through UL approval to extend an existing PUSCH resource by an eNB. In this case, the U(i), L(i), and i=1, 2, . . . , 2N may be preset to the UE by the eNB via a high layer signal.

B.3 The aforementioned proposed method B.1 is not applied to a PUSCH resource (e.g., SPS PUSCH and re-transmission PUSCH (according to synchronization HARQ process)) that is not triggered according to UL approval and a method of dropping PUSCH transmission and then transmitting UCI through a PUCCH like in the proposed steps A.1 and A.2 is proposed. However, in the case of the SPS PUSCH, UCI of some CCs may be PUSCH-piggybacked, as described with reference to A.1 above.

For example, when an extended PRB from a PRB region allocated for PUSCH transmission is considered for A/N piggyback, an eNB may indicate whether the extended PRB is applied to UL approval, etc. like in the step (1) of B.1. In this case, a PUSCH without separate UL approval, e.g., an SPS PUSCH and re-transmission PUSCH may not apply the proposed step (1) of B.1. Accordingly, in this case, PUSCH transmission may be dropped and then UCI may be transmitted or only some UCI may be transmitted through the PUCCH using the proposed methods A.1 and A.2 above. As an additional step of the proposed method, the additional PRB according to B.1 or B.2 may be used for PUSCH piggyback of UCI with respect to a PUSCH (without UL approval) of a PCell with obvious priority and the additional PRB may not be permitted and B.3 may be applied with respect to a PUSCH (without UL approval) of an SCell in which it is difficult to compare priorities.

B.4 Method of applying rate matching (or puncturing) to UCI in consideration of overlapped regions when B.1 is applied and a portion of the extended PRB region overlaps an SRS bandwidth.

An existing PRB region for PUSCH transmission in B.1 does not overlap an SRS bandwidth but the extended PRB region may partially overlap an SRS bandwidth. Accordingly, rate matching (or puncturing) of UCI may be applied in consideration of a correlation between the extended PRB region and the SRS bandwidth. For example, when a portion of the extended PBR region overlaps an SRS bandwidth, it may be assumed that both a PRB region allocated for PUSCH transmission and the extended PRB region overlap an SRS bandwidth and rate matching or puncturing may be performed. In addition, whether rate matching or puncturing is performed may be independently determined with respect to a PUSCH RB and an additional RB according to whether the PUSCH RB and the additional RB each overlap an SRS bandwidth.

Figure 16:
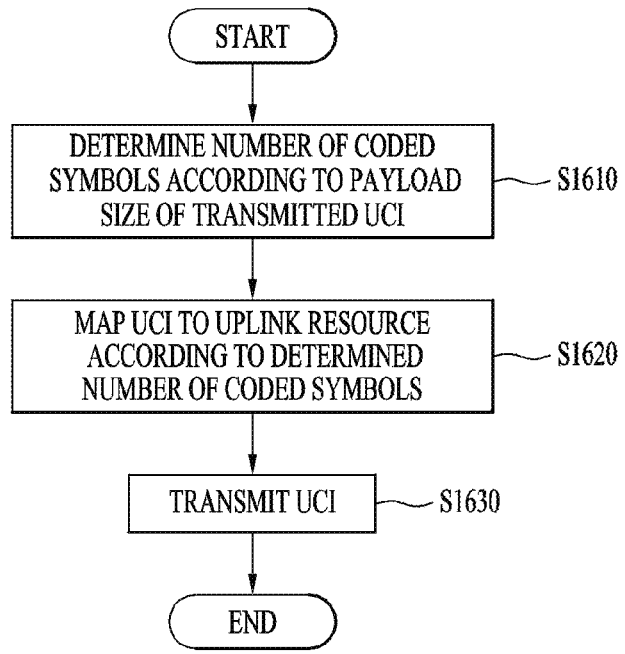
FIG. 16 illustrates a step according to an exemplary embodiment of the present invention.

FIG. 16 illustrates a step according to an exemplary embodiment of the present invention.

FIG. 16 illustrates a method of transmitting uplink control information in a wireless communication system. The method is performed by a UE.

The UE may determine the number of coded symbols according to a payload size of the uplink control information to be transmitted (S1610). The UE may map the uplink control information to an uplink resource according to the determined number of the coded symbols (S1620). The coded symbol number may be determined using a parameter selected according to a payload size of the uplink control information to be transmitted.

The UE may receive the parameter via high layer signaling from the eNB. The parameter may be selected as a first value when the payload size of the uplink control information to be transmitted is equal to or less than a specific value and may be selected as a second value when the payload size of the uplink control information to be transmitted is greater than the specific value.

The uplink resource may include a physical uplink shared control channel (PUSCH). That is, the UE may transmit the uplink control information to a PUSCH via piggyback.

The UE may determine whether a resource for the uplink control information in the uplink resource is extended or some content of the uplink control information is omitted according to one of a coding rate value calculated based on a payload size of the uplink control information to be transmitted, the number of carriers of elements set to the UE, and upper layer signaling.

When the uplink control information includes information on a plurality of downlink component carriers, the UE may further perform mapping of the uplink control information to an uplink resource of a plurality of uplink component carriers. That is, the UE may transmit the uplink control information to the eNB through a plurality of uplink component carriers.

In addition, the UE may map uplink control information on a maximum number of downlink component carriers, which does not exceed a maximum payload of the corresponding uplink resource, from an uplink resource with high priority among uplink resources of the plurality of uplink component carriers.

According to the above method, information on a group of downlink component carriers allocated to each uplink resource may be received according to the number of uplink resources of the plurality of uplink component carriers and the uplink control information may be mapped to the uplink resource using the received information.

According to the above method, information on the plurality of downlink component carriers may be concatenated to acquire uplink control information and the integrated uplink control information may be mapped to uplink resources of the plurality of uplink component carriers in subframe units using a time-first method.

Figure 17:
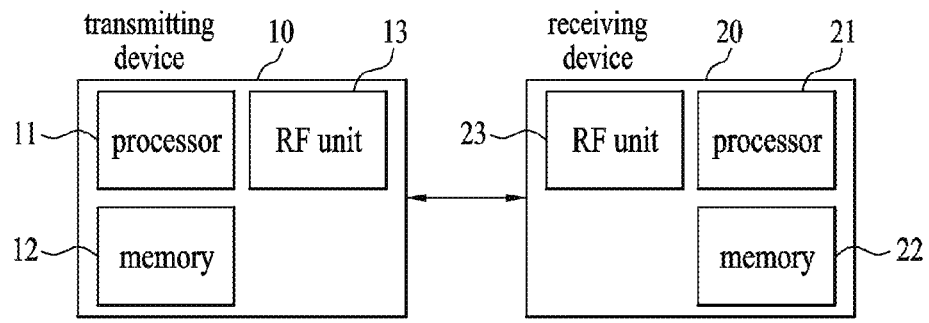
FIG. 17 is a block diagram of a device according to exemplary embodiment(s) of the present invention.

FIG. 17 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of transmitting hybrid automatic repeat request (HARQ) acknowledgement (ACK) information by a user equipment (UE) in a wireless communication system that includes a base station (BS), the method performed by the UE and comprising:
    determining, for a physical uplink shared channel (PUSCH), a number of coded symbols for the HARQ ACK information based on a HARQ ACK beta offset parameter;
    mapping the HARQ ACK information to an uplink resource based on the determined number of the coded symbols; and
    transmitting the HARQ ACK information to the BS on the PUSCH,
    wherein the HARQ ACK beta offset parameter is a first value based on the payload size of the HARQ ACK information belonging to a first range of HARQ ACK payload sizes and the HARQ ACK beta offset parameter is a second value based on the payload size of the HARQ ACK information belonging to a second range of HARQ ACK payload sizes, and
    wherein the second range of HARQ ACK payload sizes is different from and is contiguous with the first range of HARQ ACK payload sizes.

2. The method according to claim 1, further comprising receiving plural configured HARQ ACK beta offset parameters via higher layer signaling.

3. The method according to claim 2, wherein the receiving the plural configured HARQ ACK beta offset parameters via higher layer signaling comprises:
    receiving the plural configured HARQ ACK beta offset parameters via a radio resource control (RRC) signal from the BS.

4. The method according to claim 1, further comprising:
    determining whether a resource for the HARQ ACK information in the uplink resource is extended or a part of contents of the HARQ ACK information is omitted according to one of a coding rate value calculated based on the payload size of the HARQ ACK information to be transmitted, a number of component carriers configured for the terminal, or higher layer signaling.

5. The method according to claim 1, wherein the mapping comprises:
    mapping the HARQ ACK information to an uplink resource of a plurality of uplink component carriers when the HARQ ACK information includes HARQ ACK information for a plurality of downlink component carriers.

6. The method according to claim 5, further comprising:
    when the payload size of the HARQ ACK information for the plurality of downlink component carriers exceeds a maximum payload of the uplink resource of the plurality of uplink component carriers,
    mapping the HARQ ACK information for a maximum number of downlink component carriers that does not exceed the maximum payload to an uplink resource having a highest priority among the uplink resources of the plurality of uplink component carriers; then mapping remaining HARQ ACK information, other than the HARQ ACK information for the maximum number of downlink component carriers, to another uplink resource of the plurality of uplink component carriers, having a next priority.

7. The method according to claim 5, further comprising:
receiving information on a downlink component carrier group allocated to each of the uplink resources of the plurality of uplink component carriers according to a number of uplink resources of the plurality of uplink component carriers; and
mapping the HARQ ACK information to the uplink resources of the plurality of uplink component carriers using the received information.

8. The method according to claim 5, further comprising:
concatenating the HARQ ACK information for the plurality of downlink component carriers; and
mapping the concatenated information to the uplink resource of the plurality of uplink component carriers in a subframe unit by increasing a time index from a minimum time index and a minimum frequency index and then increasing a frequency index by one when the time index has a maximum value.

9. A user equipment (UE) in a wireless communication system that includes a base station (BS), the UE comprising:
a transmitter and a receiver; and
a processor that controls the transmitter and the receiver, wherein the processor:
determines, for a physical uplink shared channel (PUSCH), a number of coded symbols for hybrid automatic repeat request (HARQ) acknowledgement (ACK) information based on a HARQ ACK beta offset parameter,
maps the HARQ ACK information to an uplink resource based on the determined number of the coded symbols, and
transmits the HARQ ACK information to the BS on the PUSCH,
wherein the HARQ ACK beta offset parameter is a first value based on the payload size of the HARQ ACK information belonging to a first range of HARQ ACK payload sizes and the HARQ ACK beta offset parameter is a second value based on the payload size of the HARQ ACK information belonging to a second range of HARQ ACK payload sizes, and
wherein the second range of HARQ ACK payload sizes is different from and is contiguous with the first range of HARQ ACK payload sizes.

10. The UE according to claim 9, wherein the processor receives plural configured HARQ ACK beta offset parameters via higher layer signaling.

11. The UE according to claim 10, wherein the processor is configured to receive the plural configured HARQ ACK beta offset parameters via a radio resource control (RRC) signal from the BS.

12. The UE according to claim 9, wherein the processor determines whether a resource for the HARQ ACK information in the uplink resource is extended or a part of contents of the HARQ ACK information is omitted according to one of a coding rate value calculated based on the payload size of the HARQ ACK information to be transmitted, a number of component carriers configured for the terminal, or higher layer signaling.

13. The UE according to claim 9, wherein the processor is configured to map the HARQ ACK information to an uplink resource of a plurality of uplink component carriers when the HARQ ACK information includes HARQ ACK information for a plurality of downlink component carriers.

14. The UE according to claim 13, wherein when the payload size of the HARQ ACK information for the plurality of downlink component carriers exceeds a maximum payload of the uplink resource of the plurality of uplink component carriers, the processor maps the HARQ ACK information for a maximum number of downlink component carriers that does not exceed the maximum payload to an uplink resource having the highest priority among uplink resources of the plurality of uplink component carriers, and then maps remaining HARQ ACK information, other than the HARQ ACK information for the maximum number of downlink component carriers, to another uplink resource of the plurality of uplink component carriers, having a next priority.

15. The UE according to claim 13, wherein the processor receives information on a downlink component carrier group allocated to of the uplink resources of the plurality of uplink component carriers according to a number of uplink resources of the plurality of uplink component carriers and maps the HARQ ACK information to the uplink resources of the plurality of uplink component carriers using the received information.

16. The UE according to claim 13, wherein the processor concatenates HARQ ACK information for the plurality of downlink component carriers and maps the concatenated information to the uplink resource of the plurality of uplink component carriers in a subframe unit by increasing a time index from a minimum time index and a minimum frequency index and then increasing a frequency index by one when the time index has a maximum value.

17. A method of operating a user equipment (UE) in a wireless communication system that includes a base station (BS), the method performed by the UE and comprising:
based on a size of a hybrid automatic repeat request (HARQ) acknowledgement (ACK) payload for a physical uplink shared channel (PUSCH), the size corresponding to one of a predetermined set of HARQ ACK payload size ranges, the predetermined set comprising a first range of HARQ ACK payload sizes and a second range of HARQ ACK payload sizes, determining a number of coded symbols for the HARQ ACK based on one of a plurality of beta offset parameter values including a first value and a second value provided by a higher layer, the first value and the second value being related to the first range of HARQ ACK payload sizes and second range of HARQ ACK payload sizes, respectively,
wherein the second range of HARQ ACK payload sizes is different from and is contiguous with the first range of HARQ ACK payload sizes;
mapping the determined number of the coded symbols for the HARQ ACK to a PUSCH resource; and
transmitting the HARQ ACK to the BS via the PUSCH on the PUSCH resource.

18. The method according to claim 17, wherein the PUSCH includes uplink data in addition to the HARQ ACK.

19. A user equipment (UE) in a wireless communication system that includes a base station (BS), the terminal comprising:
a transmitter and a receiver; and
a processor that controls the transmitter and the receiver, wherein the processor:
based on a size of a hybrid automatic repeat request (HARQ) acknowledgement (ACK) payload for a physical uplink shared channel (PUSCH), the size corresponding to one of a predetermined set of HARQ ACK payload size ranges, the predetermined set comprising a first range of HARQ ACK payload sizes and a second range of HARQ ACK payload sizes, determines a number of coded symbols for the HARQ ACK based on one of a plurality of beta offset parameter values including a first value and a second value provided by a higher layer, the first value and the second value being related to the first range of HARQ ACK payload sizes and second range of HARQ ACK payload sizes, respectively, wherein the second range of HARQ ACK payload sizes is different from and is contiguous with the first range of HARQ ACK payload sizes;

maps the determined number of the coded symbols for the HARQ ACK to a PUSCH resource; and transmits the HARQ ACK to the BS via the PUSCH on the PUSCH resource.

20. The UE according to claim 19, wherein the PUSCH includes uplink data in addition to the HARQ ACK.

21. The method according to claim 1,
wherein the HARQ ACK information comprises the HARQ ACK information and rank indication (RI) information,
wherein the HARQ ACK beta offset parameter comprises a HARQ ACK/RI beta offset parameter,
wherein the first range of HARQ ACK payload sizes comprises a first range of HARQ ACK/RI payload sizes, and
wherein the second range of HARQ ACK payload sizes comprises a second range of HARQ ACK/RI payload sizes.

22. The UE according to claim 9,
wherein the HARQ ACK information comprises the HARQ ACK information and rank indication (RI) information,
wherein the HARQ ACK beta offset parameter comprises a HARQ ACK/RI beta offset parameter,
wherein the first range of HARQ ACK payload sizes comprises a first range of HARQ ACK/RI payload sizes, and
wherein the second range of HARQ ACK payload sizes comprises a second range of HARQ ACK/RI payload sizes.

23. The method according to claim 17,
wherein the HARQ ACK information comprises the HARQ ACK information and rank indication (RI) information,
wherein the HARQ ACK beta offset parameter comprises a HARQ ACK/RI beta offset parameter,
wherein the first range of HARQ ACK payload sizes comprises a first range of HARQ ACK/RI payload sizes, and
wherein the second range of HARQ ACK payload sizes comprises a second range of HARQ ACK/RI payload sizes.

24. The UE according to claim 19,
wherein the HARQ ACK information comprises the HARQ ACK information and rank indication (RI) information,
wherein the HARQ ACK beta offset parameter comprises a HARQ ACK/RI beta offset parameter,
wherein the first range of HARQ ACK payload sizes comprises a first range of HARQ ACK/RI payload sizes, and
wherein the second range of HARQ ACK payload sizes comprises a second range of HARQ ACK/RI payload sizes.

* * * * *